US012572649B2

(12) United States Patent
Rosadini et al.

(10) Patent No.: US 12,572,649 B2
(45) Date of Patent: Mar. 10, 2026

(54) METHOD FOR PROTECTION FROM CYBER ATTACKS TO A VEHICLE BASED UPON TIME ANALYSIS, AND CORRESPONDING DEVICE

(71) Applicant: Marelli Europe S.p.A., Corbetta (IT)

(72) Inventors: Christian Rosadini, Corbetta (IT); Simona Chiarelli, Corbetta (IT); Anastasia Cornelio, Corbetta (IT); Walter Nesci, Corbetta (IT); Sergio Saponara, Pisa (IT); Pierpaolo Dini, SanFrediano a Settimo Cascina Pisa (IT); Alessio Gagliardi, Catanzaro (IT)

(73) Assignee: Marelli Europe S.p.A., Corbetta (IT)

( * ) Notice: Subject to any disclaimer, the term of this patent is extended or adjusted under 35 U.S.C. 154(b) by 365 days.

(21) Appl. No.: 18/163,488

(22) Filed: Feb. 2, 2023

(65) Prior Publication Data

US 2023/0244785 A1 Aug. 3, 2023

(30) Foreign Application Priority Data

Feb. 2, 2022 (IT) ........................ 102022000001814

(51) Int. Cl.
*G06F 21/55* (2013.01)
*H04L 9/40* (2022.01)

(52) U.S. Cl.
CPC ........ *G06F 21/554* (2013.01); *H04L 63/1425* (2013.01); *H04L 63/1441* (2013.01); *G06F 2221/034* (2013.01)

(58) Field of Classification Search
CPC ............. G06F 21/554; G06F 2221/034; H04L 63/1425; H04L 63/1441
See application file for complete search history.

(56) References Cited

U.S. PATENT DOCUMENTS

2011/0057830 A1 * 3/2011 Sampigethaya ...... G01S 5/0289
342/36
2016/0188396 A1 6/2016 Sonalker et al.
(Continued)

FOREIGN PATENT DOCUMENTS

CN 110275508 A 9/2019

OTHER PUBLICATIONS

Search Report for Italian Patent Application No. 202200001814 dated Sep. 9, 2022.

*Primary Examiner* — Carl G Colin
*Assistant Examiner* — Zhe Liu
(74) *Attorney, Agent, or Firm* — Howard & Howard Attorneys PLLC

(57) ABSTRACT

A method for protection from cyber attacks in a vehicle communication network including the steps of executing a protection and monitoring procedure comprising: a learning step that includes: acquiring sets ($\vec{V}_{ID_k}$) of values of times of arrival ($TS_{IDk}$) of messages (MSG) exchanged on the network, ordered according to a respective message identifier ($ID_k$), computing one or more statistical parameters $$\left(\mu_{ID_k}, s^2_{ID_k}\right)$$

of the sets of arrival-time values ($TS_{IDk}$), and subsequently obtaining statistical parameters ($\vec{\omega}ID_k$) of confidence windows for one or more statistical parameters $$\left(\mu_{ID_k}, s^2_{ID_k}\right)$$

of the sets of arrival-time values ($TS'_{IDk}$); and a subsequent classification and anomaly-detection step that includes: acquiring sets ($\vec{u}_{ID_k}$) of values of times of arrival ($TS'_{IDk}$) at the device of messages (MSG'), computing corresponding one or more statistical parameters $$\left(\mu'_{ID_k}, s^2_{ID_k}\right)$$

(Continued)

of the sets of arrival-time values (TS'$_{IDk}$) to obtain votes (V,W) of membership of the statistical parameters $$\left(\mu'_{ID_k},\, s^2_{ID_k}\right)$$

of the sets of arrival-time values (TS'$_{IDk}$) in confidence windows of the sets of arrival-time values (TS'$_{IDk}$), and evaluating issuing of malicious-message alarms (AL) on the basis of the membership votes (V, W).

9 Claims, 7 Drawing Sheets

(56)　　　　　　References Cited

U.S. PATENT DOCUMENTS

| | | | |
|---|---|---|---|
| 2016/0381066 A1 | 12/2016 | Galula et al. | |
| 2017/0302626 A1 * | 10/2017 | Yan | H04L 63/101 |
| 2020/0067861 A1 * | 2/2020 | Leddy | G06F 21/6245 |
| 2020/0067955 A1 * | 2/2020 | Hass | H04L 12/40013 |
| 2020/0143053 A1 * | 5/2020 | Gutierrez | G06F 21/554 |
| 2020/0145433 A1 * | 5/2020 | Gutierrez | H04L 63/1425 |
| 2020/0183373 A1 * | 6/2020 | Choi | G05B 23/024 |
| 2021/0078533 A1 * | 3/2021 | Bedard | B60R 25/24 |
| 2021/0203682 A1 * | 7/2021 | Bajpai | H04L 63/0435 |
| 2022/0038903 A1 * | 2/2022 | Fu | H04W 12/106 |
| 2022/0198305 A1 * | 6/2022 | Fotak | G06N 7/01 |
| 2022/0407874 A1 * | 12/2022 | Joo | G06N 3/04 |
| 2023/0300000 A1 * | 9/2023 | Poustchi | H04L 69/40 |
| | | | 370/431 |

* cited by examiner

METHOD FOR PROTECTION FROM CYBER ATTACKS TO A VEHICLE BASED UPON TIME ANALYSIS, AND CORRESPONDING DEVICE

CROSS-REFERENCE TO RELATED APPLICATIONS

The present application claims priority to and all the benefits of Italian Patent Application No. 102022000001814 filed on Feb. 2, 2022, which is hereby expressly incorporated herein by reference.

BACKGROUND OF THE INVENTION

1. Field of the Invention

The present invention relates to techniques for traffic monitoring and protection from cyber attacks in a communication network, in particular a CAN (Controller Area Network), of a vehicle, the network comprising a bus, in particular a CAN-bus, and a plurality of nodes associated to said bus in a signal-exchange relationship and associated at least in part to control units for controlling functions of the vehicle.

2. Description of the Related Art

The CAN-bus, adopted as communication bus in motor vehicles, is a communication means of a serial and multi-master type, in which each master, also referred to as node, connected to the bus is able to send, receive, and solve the conflicts of simultaneous access in transmission by a number of nodes.

Schematically illustrated in FIG. 1 is a CAN-bus 10, comprising a plurality of nodes 11. Indicated in FIG. 1 are three nodes 11₁, . . . , 11₃. A node 11, which is able to communicate on a CAN-bus 10, in general comprises, as shown in FIG. 1:

a CAN transceiver 12, which is associated, through a transmission line TT and a reception line TR, to the CAN-bus 10 and is configured to manage the electrical levels proper to the CAN-bus (physical layer of the OSI model);

a CAN controller 13, which is connected, through a transmission line CT and a reception line CR, to the CAN transceiver 12, and is configured to manage the logic levels and the serialization of the CAN-bus 10 (data-link layer of the OSI model); and a microcontroller 14, which contains the logic of transmission and reception of the messages (management of the OSI layers higher than the data-link layer).

The bus 10 comprises two lines. Denoted by 10H is the high line of the CAN-bus 10, or CAN-high, while denoted by 10L is the low line, or CAN-low. At the two ends of the bus 10 the two lines 10H and 10L are terminated by termination resistances 10R. In FIG. 1, the transmission lines TT are coupled to the high line 10H, whereas the reception lines TR are coupled to the low line 10L.

Hence, the CAN-bus 10 is a differential bus and therefore has a structure with two lines, referred to as "CAN-high" 10H and "CAN-low" 10L.

The methods of identification of malicious messages in a CAN-bus that connects a plurality of nodes, for example electronic control units (ECUs), aim at determining what message is malicious, but above all from what node or ECU it comes, so as to be able to track the source itself of the attack and adopt the necessary measures. Intrusion-detection systems currently implemented on vehicles manage to determine the presence of a cyber attack, but are not equipped with an attacker-recognition system.

Provided in Table 1 is the structure of a message according to the CAN protocol; in particular, the message of a data type is structured with contiguous sections S of bits, as listed below.

TABLE 1

| Section S [size in bits] | | Content of section S |
|---|---|---|
| S1 | SOF [1 bit] | start of CAN message |
| S2 | Arbitration Field [12/32 bits] | contains message identifier ID |
| S3 | Control Field [6 bits] | contains the information of the length of the data transmitted |
| S4 | Data Field [0-64 bits] | data section (information content of the message) |
| S5 | CRC Field [16 bits] | integrity-check code (with delimiter field) |
| S6 | ACK Field [2 bits] | to confirm proper reception by the other nodes (with delimiter field) |
| S7 | EoF [7 bits] | area of recessive bits necessary for signalling end-of-message |
| S8 | ITM [3 bits] | intermission area, i.e., area of recessive bits that functions as separator between messages |

The fields of interest of the message are mainly the arbitration field S1 and the ACK (Acknowledge) field S6. The arbitration field is constituted by the message ID (IDentifier), which determines the priority thereof and identifies the message. The smaller the binary value, the higher the priority. The ACK bit, which is originally recessive (and hence at 1), is overwritten with a dominant bit by the ECUs or nodes 11 that correctly receive the message. In this way, each node acknowledges the integrity of the message.

As regards the aforesaid arbitration field S2, the CAN Controller 13 of a node 11 reconstructs the identifier ID of the message from the logic signals that reach it (which are consistent with the physical layer detected by the CAN Transceiver 12), whereas the microcontroller 14 within the node 11 itself associates to the aforesaid message a time value, referred to as timestamp, of arrival. Each CAN node 11 connected to the network 10 is configured with a set of message identifiers ID that it can transmit, where each message identifier ID in this set may correspond to a parameter of a sensor or else to a specific function (diagnosis, etc.). The above message identifiers ID, albeit different for different nodes 11, can be cloned by a possible attacker, if the latter acquires control of one of the nodes of the network. Moreover, the messages sent through the CAN 10 may have a periodic nature, and thus be transmitted in a precise period, or else an aperiodic nature, and thus be transmitted upon the occurrence of events.

Techniques are hence known based upon the time drift, which are aimed at the nominally periodic messages. Thus, exploiting the timestamp, it is possible to arrive at an estimate of the period between two consecutive messages having the same message identifier ID. If a message is periodic it is associated to a timestamp, i.e., a reception time, specific for the message, but in any case dependent upon a constant period of transmission between messages of one and the same node. Consequently, it is assumed that, however similar two distinct ECUs that represent two nodes 11 may be and even though they may be produced by the same manufacturer and even with the same circuit components, they have two different time drifts. Each ECU in fact can function thanks to the respective clock signal, and even though two ECUs can function with a clock at the same frequency, in actual fact this results in a random drift in the period between the two signals, which has repercussions on transmission of CAN messages. Consequently, the aforesaid skew in effect represents a non-reproducible factor intrinsic to each ECU node, which can be estimated applying certain techniques.

Described hereinafter are some typical scenarios of attack.

One type of attack is referred to as "fabrication attack". Through an in-vehicle ECU compromised in such a way as to be a strong attacker, the adversary fabricates and injects messages with forged ID (Identifier), DLC (Data-Length Code), and data. The objective of this attack is to override any periodic messages sent by legitimate safety-critical ECUs, so that their receiver ECUs get distracted or become inoperable. For instance, the attacker injects various malicious messages with a given ID, for example 0xB0, which is usually sent by a legitimate ECU, at a high frequency. Thus, other nodes that normally receive the message 0xB0 are forced to receive the fabricated attack messages more frequently than the legitimate ones. In such a case, the attacker ECU is carrying out a fabrication attack on the message 0xB0 and on its original transmitter, the legitimate ECU.

Another type of attack is referred to as "suspension attack". To carry out a suspension attack, the attacker needs just one weakly compromised ECU. As in the case of Denial-of-Service (DoS) attacks, the objective of this attack is to stop/suspend transmission by the weakly compromised ECU, thus preventing delivery/propagation of information that is acquired by other ECUs on the CAN, the reason for this being that some ECUs must receive specific information from other ECUs for their proper operation. Consequently, the suspension attack can damage not only the weakly compromised ECU, but also other receiver ECUs.

Another type of attack is referred to as "masquerade attack". To mount a masquerade attack, the attacker needs to compromise two ECUs, one as a strong attacker and the other as a weak attacker. The objective of this attack is to manipulate an ECU while masking the condition of the ECU being compromised. Up to a given masquerade instant, the adversary monitors and learns what messages are sent and at what frequency by its weaker attacker; for example, the weak attacker sends the message 0xB0 every 20 ms. Since most network messages are periodic and broadcast, for example, over CAN, it is easy to learn their identifiers (IDs) and the transmission intervals. Once the adversary has learnt the ID and the frequency of a message, at the masquerade instant the adversary stops transmission of its weak attacker and utilizes its strong attacker to fabricate and inject attack messages with ID=0xB0. Stopping transmission of the weak attacker and exploiting the strong attacker for transmission of malicious messages has the purpose of overcoming the inability of the weak attacker to inject messages. After the masquerade instant, the original transmitter of 0xB0, i.e., the weak attacker, does not send that message, whereas the strong attacker sends it, instead, at its original frequency. So, when the traffic of the bus, for example, the CAN-bus, is observed, the frequency of the message 0xB0 remains the same, whereas its transmitter has changed.

From the above examples, it is evident how important it is to manage to discriminate from which ECU the attack really comes, especially in the case of a masquerade attack. In this regard, it may be noted that a drawback of the bus such as the CAN-bus is the absence of a MAC Address that makes it possible to trace directly back to the electronic control unit/device 11 that has sent the message at that precise moment on the bus, unlike, for example, the Ethernet protocol, where the MAC Address is instead present. This problem is particularly complex to solve in embedded systems.

SUMMARY OF THE INVENTION

The object of the present invention is to provide a monitoring method that will make it possible to identify the electronic control unit that transmits a message, in particular a message linked to an attack.

According to the present invention, the above object is achieved thanks to a protection method, as well as to a corresponding protection device, that present the characteristics referred to specifically in the ensuing claims. Other objects, features and advantages of the present invention will be readily appreciated as the same becomes better understood after reading the subsequent description taken in connection with the accompanying drawings.

BRIEF DESCRIPTION OF THE DRAWINGS

The invention will be described with reference to the annexed drawings, which are provided purely by way of non-limiting example and in which.

DETAILED DESCRIPTION OF THE INVENTION

The method described herein envisages exploiting a statistical analysis of the periodic messages coming from the ECUs of a specific communication sub-network based upon the CAN protocol. The above statistical analysis is based upon extrapolation of the times of arrival of each periodic message. The arrival time of each message is available directly via the use of standard libraries present in the firmware of any embedded system. Hence, it is assumed as working hypothesis, which in effect does not introduce any contraindication or limit to the use of the methodology described hereinafter, that the information on the arrival times of the messages is a measurable variable, i.e., a variable that can be obtained at the nodes.

Figure 1:
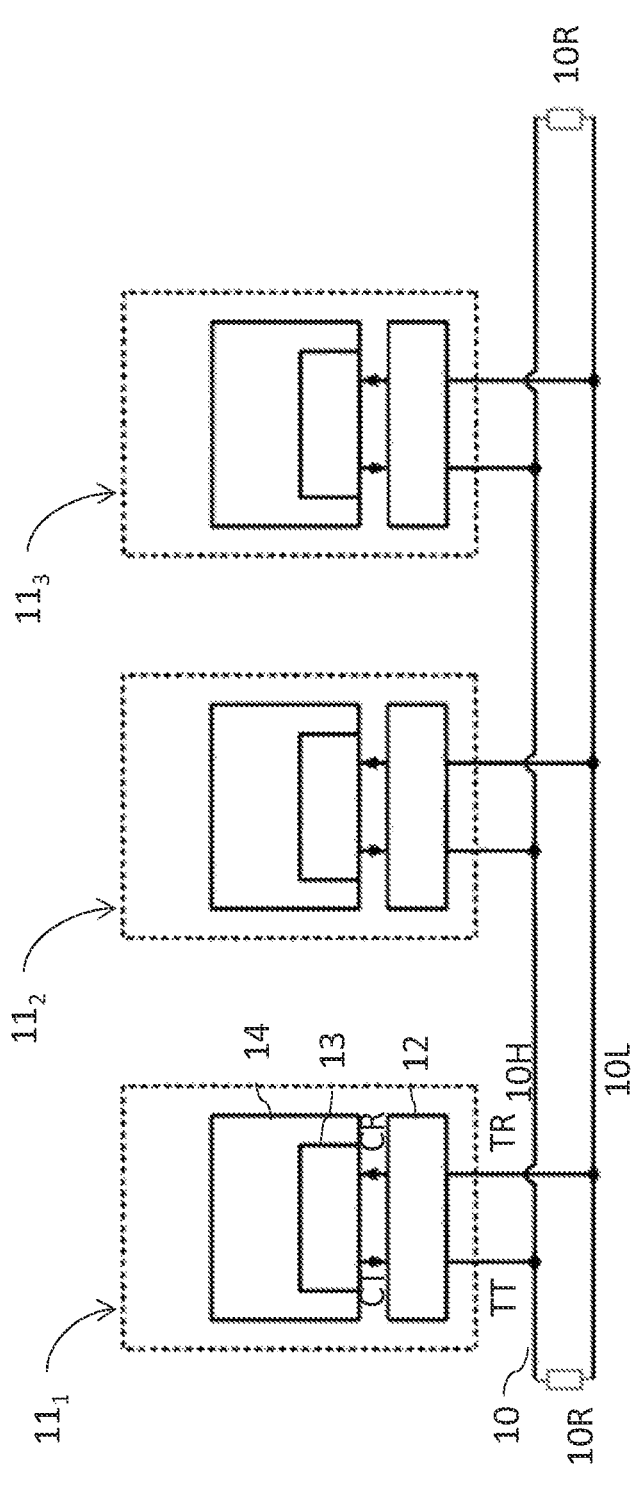
FIG. 1 is a schematic illustration of a CAN bus of the type known in the related art.
Figure 2:
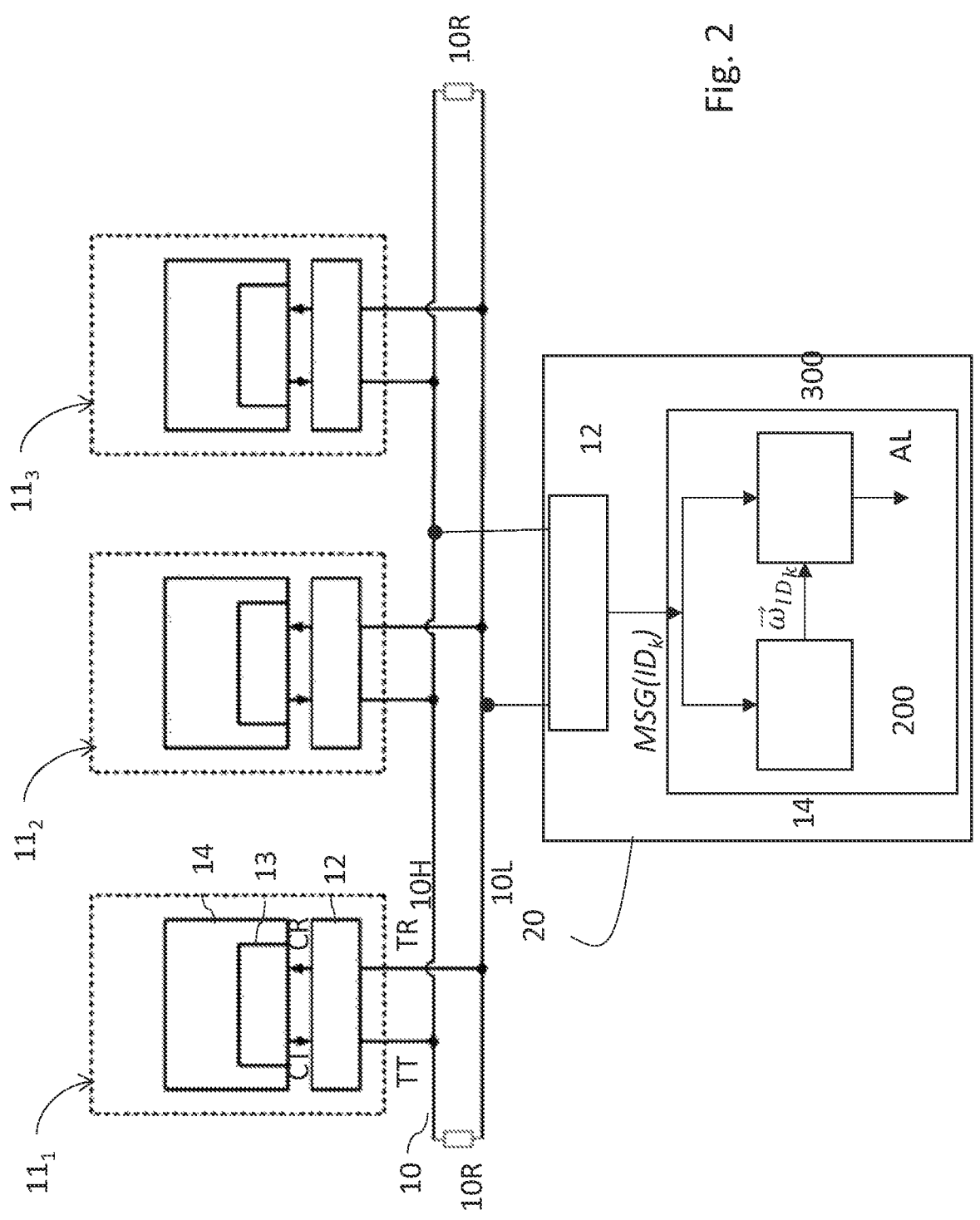
FIG. 2 represents a diagram that shows a device that implements the method described herein.

In this connection, illustrated in FIG. 2 is the CAN-bus 10 of FIG. 1 comprising the three nodes $11_1, \ldots, 11_3$, each with the respective modules 12, 13, 14 illustrated previously. Moreover, represented coupled on the CAN-bus 10, in a signal-exchange relationship with the CAN-bus 10, is a device for device for traffic monitoring and protection from cyber attacks 20, where by "traffic" is meant the traffic of messages on the CAN, the device 20 comprising one or more microprocessors and being configured for implementing an online protection procedure 100, the flowchart of which is synthetically and schematically represented within the microcontroller module 14 of the device for traffic monitoring and protection from cyber attacks 20, which comprises an online learning step 200, followed by a classification and anomaly-detection step 300. The online learning step 200 is carried out in a first time interval—on messages received in this first time interval, which are denoted as a whole by MSG($ID_k$), where $ID_k$ is the k-th generic message identifier in a set of allowed periodic message identifiers $ID_1, \ldots, ID_k, \ldots, ID_n$—for example, during a vehicle-testing step; there are hence calculated confidence-interval statistical parameters (in particular, statistical parameters and confidence thresholds) $\vec{\omega}_{ID_k}$, which are supplied to the classification and anomaly-detection step 300, which is carried out in a second time interval subsequent to the first, on subsequent messages MSG'($ID_k$) received in this second time interval, which in general corresponds to a step of normal operation of the vehicle, subsequent to the testing step. In what follows, the messages belonging to the second time interval, and the statistical parameters deriving therefrom, are denoted by the prime sign in order to distinguish them from the corresponding ones obtained in the learning step 200.

The CAN-bus 10 illustrated corresponds to a communication sub-network according to the CAN protocol, which is monitored by the protection device 20 that implements the method described herein, and in general comprises an integer number N of nodes connected on the CAN-bus 10 itself. The device for traffic monitoring and protection from cyber attacks 20, which may have the same structure as one of the nodes 11 exemplified in FIG. 1, may be considered one of the aforesaid N nodes. A monitoring and protection system can be inserted into the entire communication network on board the vehicle, possibly by dividing it into a number of sub-networks, associated to each of which is a protection device 20. For instance, on protection device 20 may be provided for each sub-network made up at the most of N=18 connected nodes 11.

There is assumed a prior knowledge of the communication sub-network, i.e., the CAN-bus 10, on which a protection device, designated by 20 in FIG. 2, which implements the communication-monitoring method operates. Such prior knowledge is understood as the knowledge of the number of ECUs or nodes 11 that make up the sub-network, the identifiers ID of the messages that each node 11 sends on the communication bus 10 and their periodicity. This information is in effect known to the designer in a preliminary step of wiring, configuration, and testing of the communication networks, and is hence assumed as second working hypothesis for application of the method described herein. This second hypothesis, which in effect is "stronger" than the first, is in any case reasonable, all the more so if the device is introduced in infrastructures of newly produced vehicles.

Figure 3:
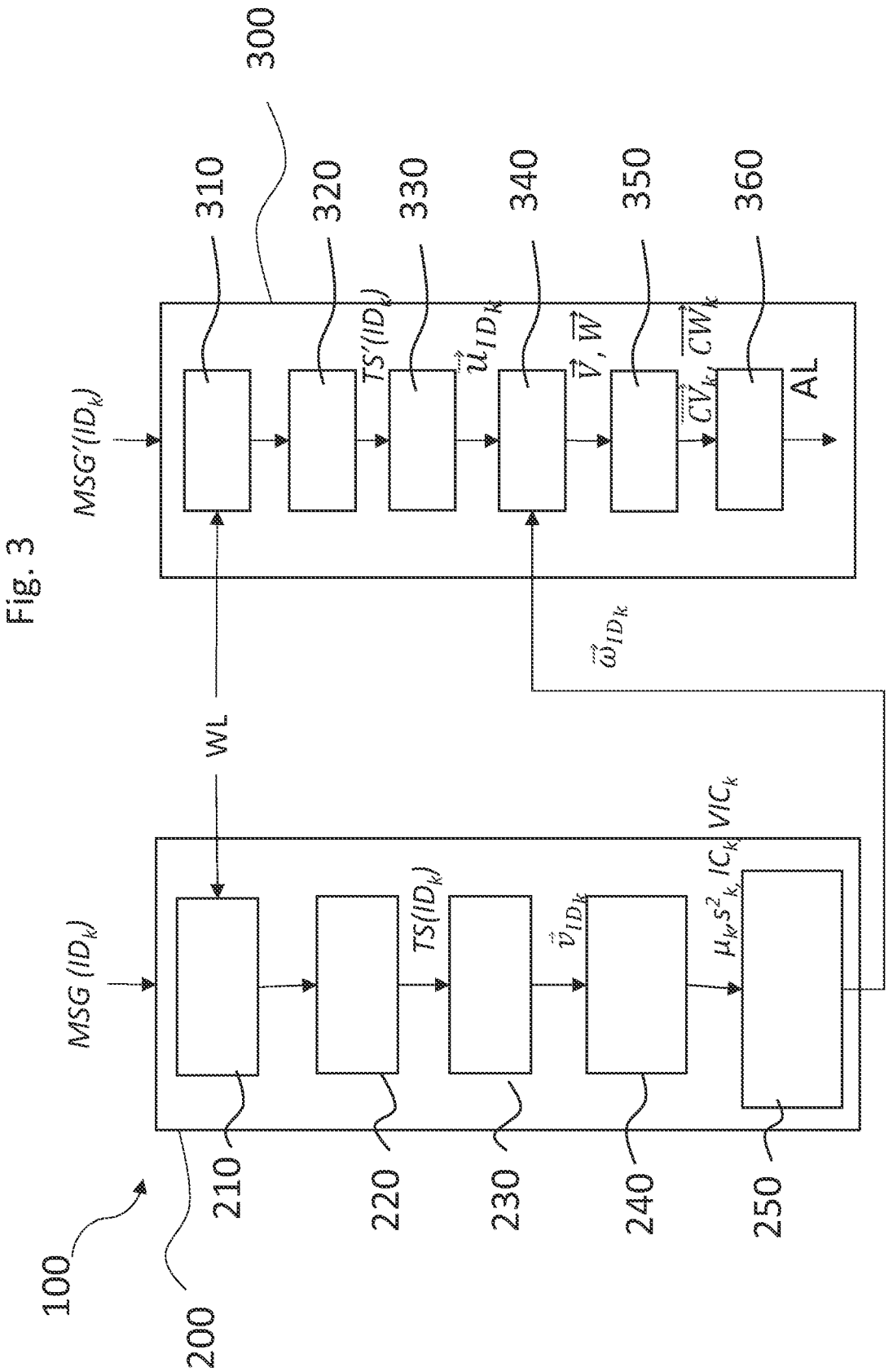
FIG. 3 illustrates a flowchart that shows the method described herein.

The monitoring and protection method 100 described herein, as has been said, and as detailed more fully in the flowchart of FIG. 3, envisages a step 200 of learning of the characteristics regarding a profile of normality of the message traffic of the specific sub-network on which the protection device 20 operates.

The above learning step 200 takes place on line, i.e., during operation of the vehicle or, rather, during the step of testing of the functions of the vehicle (whether hardware or software) so as to guarantee that the aforesaid learning step occurs in a time lapse, or in circumstances, in which certainly the communication networks/sub-networks monitored may not be accessible for carrying out cyber attacks (of the types mentioned previously).

The step 200 of the monitoring and protection method 100 of learning the characteristics of the CAN network/sub-network 10 and of the nodes/devices 11 connected thereto first comprises, by way of example, an operation of prefiltering 210 of the messages on the basis of the message identifiers ID via a so-called whitelist filter, which exploits the prior knowledge on the network traffic, i.e., the knowledge of the message identifiers ID allowed for the communication. The prefiltering step 210 hence blocks the messages with message identifiers ID not present in a list compiled beforehand, the so-called whitelist.

There is then carried out a step of calculation 220 of timestamps TS, which are used as measured variable x for calculating the statistical quantities.

This is followed by a data-collection step 230 in which, for each of the message identifiers $ID_k$, a corresponding learning vector $\vec{v}_{ID_k}$ is filled with the corresponding measurements of timestamps $TS_k$.

There is then carried out a step of calculation 240 of statistical parameters, for example mean and sample variance, which are necessary for determining decision thresholds, and of determination of such decision thresholds.

Finally, a step of quantization 250 of confidence intervals is carried out on the basis of the value of the message identifiers ID, such identifiers either belonging to the network/sub-network 10 or on the basis of the periodicity according to a prior knowledge, for a subsequent assignment of votes to each identifier ID of received message MSG, in the classification and anomaly-detection step 300 of the method described herein.

In fact, the above classification and anomaly-detection step 300, carried out on messages MSG'($ID_k$) received in the second time interval, for example during normal operation of the vehicle, comprises a filtering operation 310 with whitelist WL similar to the operation 210. There is then carried out an operation 320 of calculation of the timestamps TS'($ID_k$) similar to the operation 220.

An operation 330 is then carried out of filling monitoring vectors $\vec{u}_{ID_k}$ with the corresponding timestamps $TS'_k$ or TS'($ID_k$). The operation 330 is similar to the operation 230, even though in this case, when a monitoring vector $\vec{u}_{ID_k}$ is full, a vector-filling policy of the FIFO (First In First Out) type is adopted, in which a new value is entered at the start of the vector, shifting the other values and eliminating the oldest value.

Next, an operation 340 is carried out of calculation of the vote $V_k$, $W_k$, i.e., of calculation of a value representing the degree of membership in a given confidence interval, calculated on the basis of the confidence-interval statistical parameters $\vec{\omega}_{ID_k}$ determined and supplied by the learning step 200.

Then, in a counting operation 350, vectors $\vec{CV}_k$, $\vec{CW}_k$ of counters of maximum votes for each k-th identifier are incremented whenever a vote $V_k$, $W_k$ of a message assumes a maximum value for that identifier $ID_k$.

Finally, in an operation of classification and anomaly detection 360, it is decided, on the basis of the values contained in the vote counters CV, CW, whether to issue an alarm and which type of alarm or whether to classify the message identifier as correct.

There now follows a more detailed description of the operations referred above of the on-line learning step of the protection method 200.

The prefiltering step 210 via whitelist filter comprises checking the message identifiers ID of messages that are transmitted on the bus 10. Exploiting the hypothesis of prior knowledge of the topology of the sub-network corresponding to the CAN-bus 10 and of the message identifiers ID of the messages that can be sent by the various ECUs, i.e., nodes 11, a comparison is made between the message identifier ID of the message received at the device 20 and the identifiers ID contained in the whitelist compiled beforehand. This makes it possible to avoid the need to examine data associated to messages with message identifiers ID that are not authorized to convey information in the specific sub-network 10. Moreover, if a message has a message identifier ID that does not belong to the whitelist WL, i.e., the list known beforehand, an alarm of "access not allowed" is issued to the specific sub-network 10 being monitored.

Figure 4:
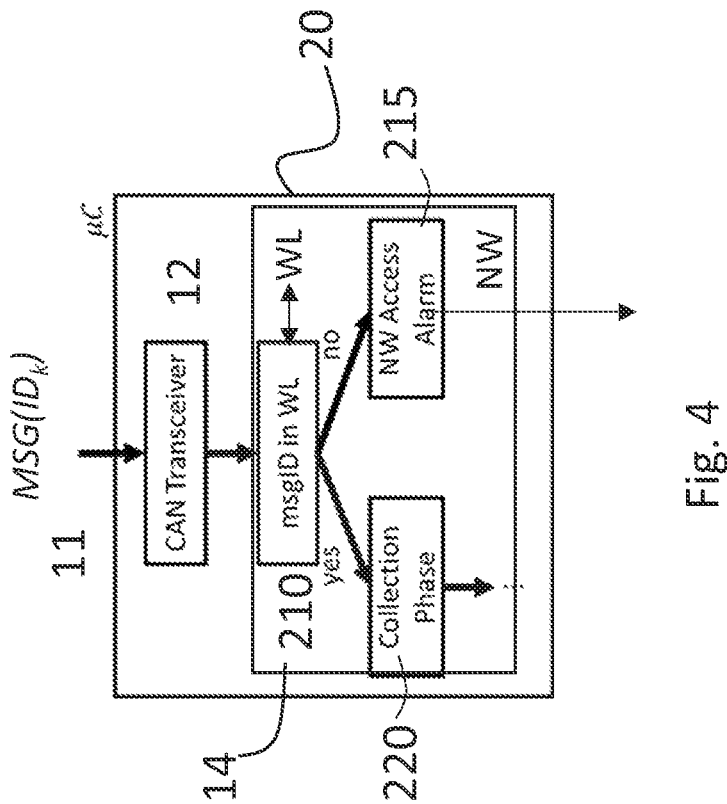
FIG. 4 shows a flowchart representing a first operation of a learning step of the method described herein.

FIG. 4 represents schematically in this regard in a flow-chart operating in block 20 the above operation 210, which carries out prefiltering. A CAN message with message identifier ID, designated by $MSG(ID_k)$, is received by the monitoring and protection device 20 through the transceiver 12 and processed by the microcontroller 14, which performs the learning step 200. In operation 210, a check is made to verify whether the current received message $MSG(ID_k)$ is present in the whitelist WL. If it is, step 220 is carried out of calculation of the timestamps TS; if not, operation 215 is carried out where an alarm of "access not allowed" NW is sent, for example, to a node on the network 10 that handles the alarms or to other software/hardware modules configured for taking countermeasures in the case of access not allowed or of anomalies.

As regards the second step of calculation 220 of the timestamps TS, this comprises extracting the corresponding values, for example via standard libraries, i.e., library functions dedicated to extraction of the timestamp from a message or frame received, from the data-structure field of the message, in which the information is contained, for example the can_pal library of NXP. In variant embodiments, it is possible to access the clock of the microcontroller of the monitoring and protection device 20 and associate a time variable x read from the clock at each message received. In general, how to acquire the time of arrival of a CAN message at a node, in particular the timestamp, forms part of the average knowledge of the person skilled in the sector.

After extraction of the temporal information corresponding to the timestamp TS, for example the generic timestamp $TS(ID_k)$ belonging to the generic message identifier $ID_k$, this temporal information is assigned according to the message identifier ID to which it belongs in a respective data structure, which is assigned to the above message identifier ID for the step 230 of collection of the timestamps TS. Hence, the collection step 230 consists in filling learning vectors or arrays $\vec{v}_{ID_k}$ until in the vector a set of data is obtained in a number sufficient for calculation of statistical parameters or indices (basically mean values and sample variances and confidence intervals) on the above set of data for each message identifier $ID_1, \ldots, ID_n$ allowed by the whitelist WL, the above statistical parameters making it possible to construct decision thresholds (operation 240) and to assign membership votes (operation 250) for carrying out classification of the messages $MSG(ID_k)$ according to the probability of their belonging to a transmission node 11 and according to the presence or absence of communication anomalies.

Figure 5:
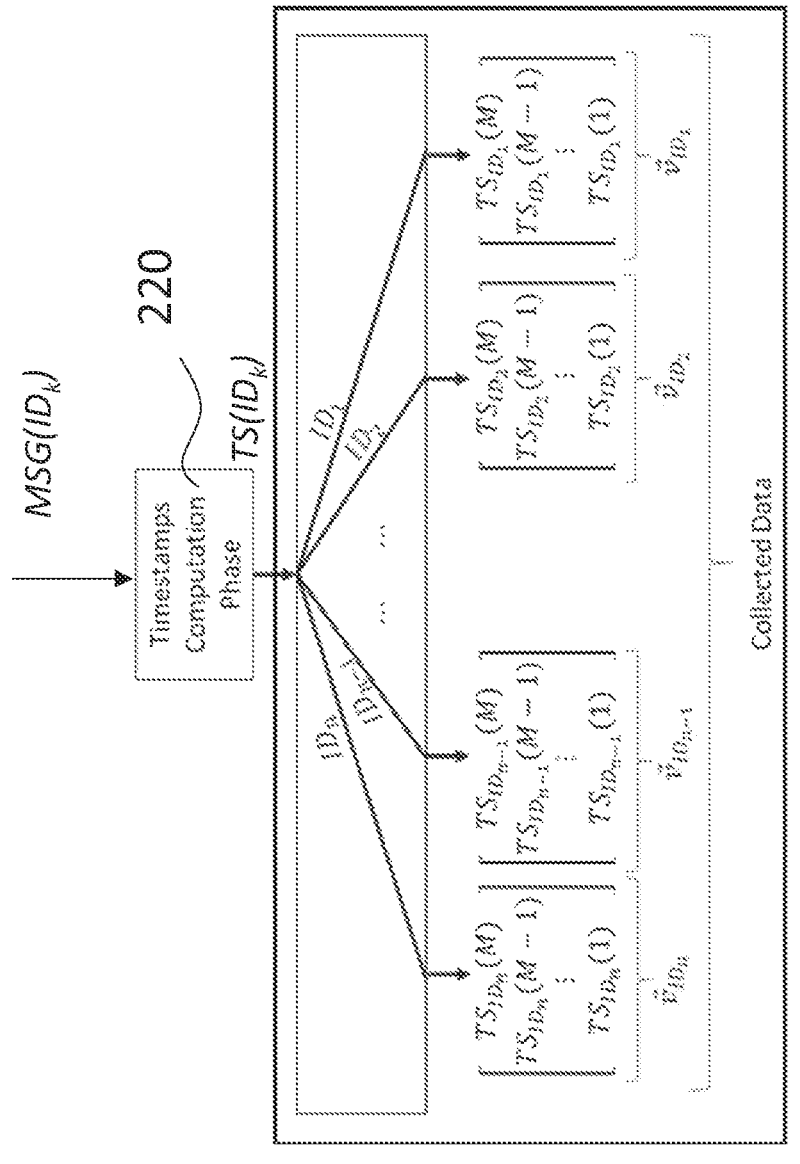
FIG. 5 shows a flowchart representing a second step of a learning step of the method described herein.
Figure 6:
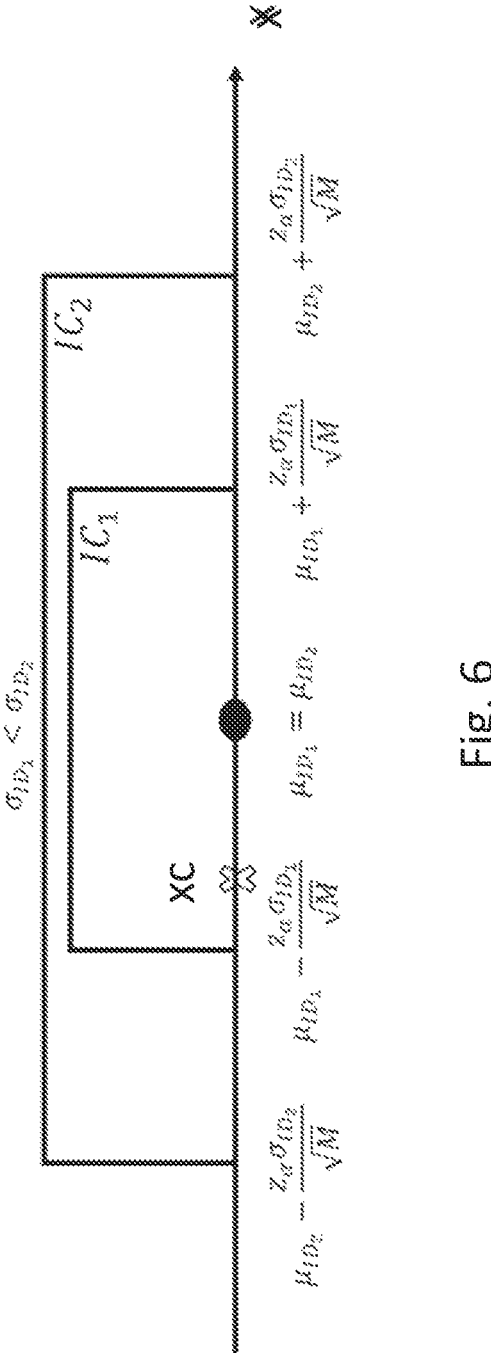
FIG. 6 shows ranges of statistical parameters used by a third step of a learning step of the method described herein.
Figure 7:
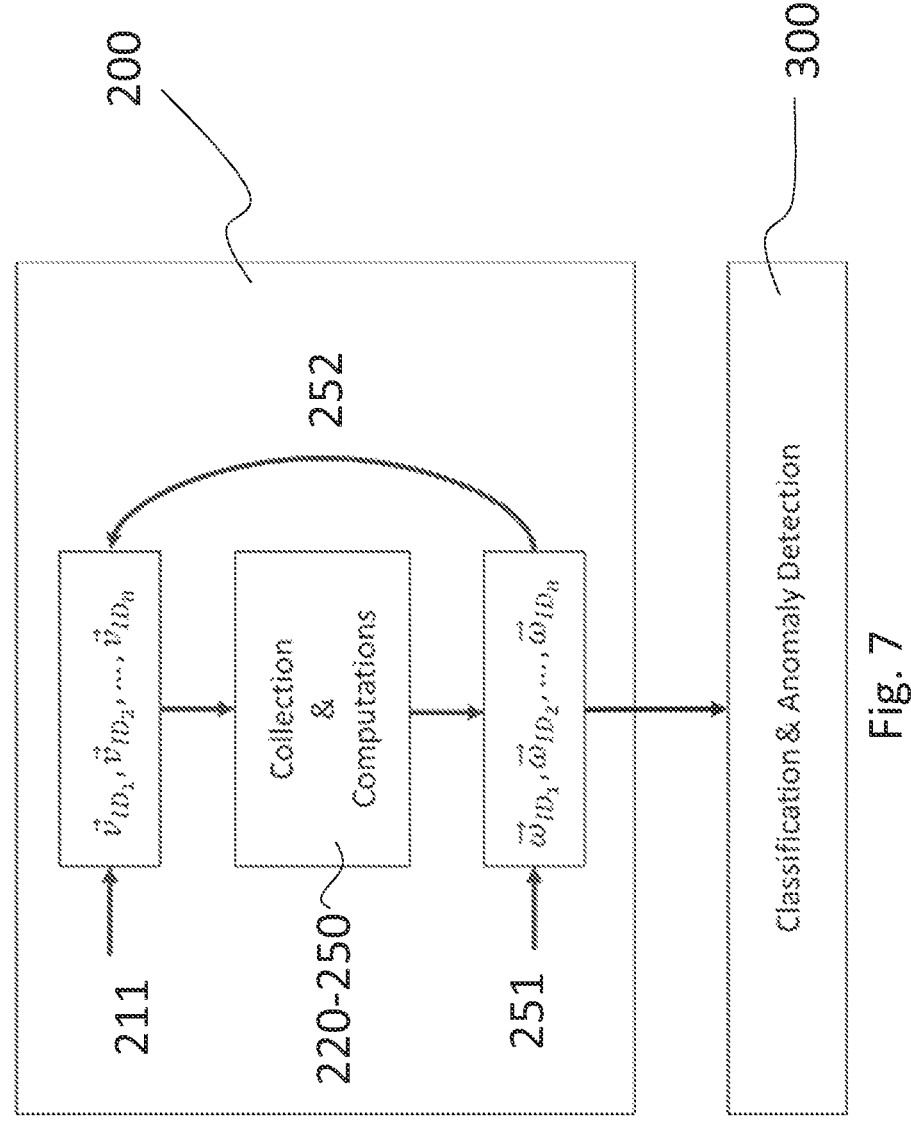
FIG. 7 shows a flowchart of operations of memory allocations associated to the method described herein.

As illustrated in the diagram of FIG. 5, designated by 220 is the operation of measurement of the time variables $TS(ID_k)$ or timestamps. At each measurement 220 of time variable or timestamp TS, on the basis of the message identifier ID to which the message $MSG(ID_k)$ corresponds, according to whether it is one of $ID_1, \ldots, ID_n$, the above measurement is collected in a respective learning vector $\vec{v}_{ID_k}$, which will thus contain the timestamp $TS_{IDk}$ of the identifier $ID_k$. FIG. 6 shows in particular n learning vectors $\vec{v}_{ID_n}, \ldots, \vec{v}_{ID_1}$ corresponding to n identifiers $ID_n, \ldots, ID_1$. Each learning vector $\vec{v}_{ID_k}$ has a length M; namely, it may comprise up to a number M of values, i.e., timestamps $TS_{IDk}(M), \ldots, TS_{IDk}(1)$, obtained from a corresponding number of messages $MSG(ID_k)$ received in the learning step 200. It may be noted that the duration of the operation 230 of collection of the data depends upon the number M of messages to be collected (length of the learning vector $\vec{v}_{ID_k}$) and upon the transmission period T for the message (or group of messages) with longest transmission period. The messages MSG are in general transmitted in a periodic way by each node 11 with a periodicity T that is specific for the transmitting node 11. If $T_{max}$ is the longest transmission period of a message, it is possible to estimate a wait time $T_{elapse}$ of the data-collection operation 230 as $T_{elapse} \approx MT_{max}$. It should be noted that, even if the learning step 200 were started after a step of setup of the vehicle, this does not mean that the vehicle is not usable for a time lapse equal to the wait time $T_{elapse}$, but only that the communication traffic between the ECUs 11 is recorded for the learning step s200 in a time lapse of the above duration.

It should moreover be noted that, if N is the number of nodes of the network, then $n \geq N$, where n is the total number of message identifiers allowed by the whitelist WL (operation 210).

The subsequent operation of threshold calculation 240 comprises computing statistical parameters starting from the vectors of time measurements $\vec{v}_{ID_k}$ stored previously. The hypothesis is exploited whereby the messages MSG that are analyzed via the monitoring and protection method 100 described herein are periodic; hence, the difference between one timestamp TS and the next for one and the same message identifier $ID_k$, is in theory constant (equal to a corresponding period $T_i$). In particular, given the same transmission period T, it is assumed that each message identifier ID associated to a message MSG sent by a different ECU, i.e., node 11, will have associated thereto a time variable, in particular timestamp, TS that varies in a range of values different from that of the other ECUs. This assumption, which is based on technical evidence, ensures that, however similar to one another the nodes 11 may be and even if at a software level the same periodicity of transmission is set, the physical circuit differences cause the variability of the time variables TS measured to be unique for each node 11 (and hence for each message MSG with a given message identifier ID). Consequently, the operation 240 comprises computing statistical parameters, referred to in what follows, and their confidence intervals.

Calculation of statistical parameters 240 comprises, in the embodiment described, computing an expected value $\mu_{ID_k}$ and a sample sample variance $$s_{ID_k}^2$$

on the basis of the values contained in a corresponding learning vector $\vec{v}_{ID_k}$ containing time measurements $TS(ID_k)$ or $TS_{ID_k}$ as denoted in what follows, associated to a respective message identifier $ID_k$, in particular on the basis of the maximum-likelihood estimate, by applying Eq. (1) below:

$$\mu_{ID_k} = \frac{1}{M} \sum_{i=1}^{M} [\vec{v}_{ID_k}]_i = \frac{1}{M} \sum_{i=1}^{M} TS_{ID_k}(i) \tag{1}$$

$$s_{ID_k}^2 = \frac{1}{M-1} \sum_{i=1}^{M} ([\vec{v}_{ID_k}]_i - \mu_{ID_k})^2 = \frac{1}{M-1} \sum_{i=1}^{M} (TS_{ID_k}(i) - \mu_{ID_k})^2$$

where the index i indicates the i-th position in the learning vector $\vec{v}_{ID_k}$ and ranges from 1 to M. Hence, for each of the message identifiers $ID_k$ a pair of values of expected value and sample variance $$(\mu_{ID_k}, s_{ID_k}^2)$$

is obtained and is used, once again in the operation 240, for calculating confidence intervals $IC_k$.

According to the method described, bilateral confidence intervals are calculated with a given level of statistical confidence $\alpha\%$ (which can be understood also as a tuning parameter of the learning algorithm 200).

Calculation 250 of the confidence interval for the expected value derives from the passages appearing in the equations below. Denoted by $\bar{X}_k$ is a random variable associated to the statistical distribution of time variables of the k-th message identifier $ID_k$, which reasonably, for the working hypotheses stated previously, corresponds to a probability distribution of a Gaussian type $$\bar{X}_k \sim N(\mu_{ID_k}, S_{ID_k}^2).$$

This probability distribution of a Gaussian type $$\bar{X}_k \sim N(\mu_{ID_k}, s_{ID_k}^2)$$

makes it possible to compute a probability P that a current time measurement $x_k$, which on the basis of the prior knowledge is deemed associated to the message identifier $ID_k$ and corresponds to a value of timestamp, can be effectively associated to the above message identifier $ID_k$, with a confidence $\alpha$, as appears in Eq. (2) below:

$$1 - \alpha = P(x_k \in ID_k) \cong P(x_k \in [\bar{x}_k, \underline{x}_k]) \tag{2}$$

$$= P\left(\frac{x_k - \mu_{ID_k}}{\frac{s_{ID_k}}{\sqrt{M}}} \in \left[\frac{\bar{x}_k - \mu_{ID_k}}{\frac{s_{ID_k}}{\sqrt{M}}}, \frac{\underline{x}_k - \mu_{ID_k}}{\frac{s_{ID_k}}{\sqrt{M}}}\right]\right)$$

$$= P(z_k \in [\bar{z}_k, \underline{z}_k])$$

Eq. (2) defines the probability $P(x_k \in ID_k)$ that the time measurement $x_k$ can be classified as belonging to the k-th message identifier $ID_k$ with a statistical confidence of $(100-\alpha)\%$. The quantities $\bar{x}_k$ and $\underline{x}_k$ are the extremes of the interval of calculation of the probabilities when the distribution $\bar{X}_k$ is considered, and are hence not known beforehand. Exploiting the assumption that the data distribution of the random variables is of a Gaussian type, we have that the variable normalized with respect to the mean value and the variance is a variable $\bar{Z}_k$ with standard Gaussian (or normal) distribution, i.e., $$\bar{Z}_k = \frac{\bar{X}_k \mu_{ID_k}}{\frac{s_{ID_k}}{\sqrt{M}}} \sim N(0, 1).$$

This enables exploitation of the properties of symmetry of the above distribution $\bar{Z}_k$ and interpretation of the extremes of the interval of calculation of the probability as a quantile $z_\alpha$ at the given level of statistical confidence $\alpha\%$ for the distribution of the data in the new random variable. In particular, by symmetry, $\bar{Z}_k = -, z_k = z_\alpha$. In this way, the argument of the probability operator has only known terms, given that the quantiles of the normal distribution are available via the tables of the values of the distribution function of the distribution itself.

Hence, it is possible to represent the confidence interval for the expected value applying the following Eq. (3):

$$x_k \in \left[\mu_{ID_k} - \frac{z_\alpha s_{ID_k}}{\sqrt{M}} \mu_{ID_k} + \frac{z_\alpha s_{ID_k}}{\sqrt{M}}\right] \tag{3}$$

Basically Eq. (3) is operatively used for deciding whether a time measurement $x_k$ has a high probability of belonging to the class associated to the k-th message identifier $ID_k$. The cardinality of each confidence interval, denoted by $IC_k$ and equal to $$\left[\mu_{ID_k} - \frac{z_\alpha s_{ID_k}}{\sqrt{M}}, \mu_{ID_k} + \frac{z_\alpha s_{ID_k}}{\sqrt{M}}\right],$$

understood as the "length" of the set of values to which a high probability of membership of the measurement in the class is attributed, is given by the quantity $$\frac{2z_\alpha s_{ID_k}}{\sqrt{M}}.$$

To describe the subsequent operation of quantization of the confidence intervals 250 for assignment of votes (which is carried out in the operation 340) reference is first made to the following limit case, where there are messages MSG with same periodicity but coming from different nodes, i.e., for example, from identifiers $ID_1$ and $ID_2$. This limit case arises when two message identifiers have same expected value ($\mu_{ID_1} = \mu_{ID_2}$) but different variance ($s_{ID_1} \neq s_{ID_2}$), namely, they have the same centre, but a different width, of the associated confidence interval, as represented schematically in FIG. 6, which shows on a horizontal axis the values of the time measurements x. Denoted by $IC_1$ is the confidence interval of the message identifier $ID_1$, and denoted by $IC_2$ is the confidence interval of the message identifier $ID_2$. Since $s_{ID_1} < s_{ID_2}$, the interval $IC_2$ comprises the interval $IC_1$, while both of the intervals are centred on the expected value $\mu_{ID_1} = \mu_{ID_2}$.

According to the classical theory of confidence intervals, if a new measurement xc, represented by a cross in FIG. 6, falls in the interval of values belonging to both of the confidence intervals $IC_1$ and $IC_2$, it must be associated to both of the classes with of confidence index $\alpha$. Hence, it is envisaged to introduce a decisional metric to associate a vote of membership in the class, i.e., the class of the identifier $ID_k$. Defined as quantization of the confidence interval is the following way of proportioning the distance from the centre $\mu_{ID_1} = \mu_{ID_2}$ to the width of the interval itself:

distances of the measured value x of the time variable from the centre of the interval are defined as $d_1 = |\mu_{ID_1} - x|$ and $d_2 = |\mu_{ID_2} - x|$ (in this example limit case these distances are equivalent: $d_1 = d_2$); and relative proportions of the measured value x with respect to the width of the confidence interval are defined, for example, as the ratio between the above distances and the half-lengths, $L_1/2$, $L_2/2$, of the confidence intervals: $p_1 = 2d_1/L_1$ and $p_2 = 2d_2/L_2$; hence, the measured value x is normalized with respect to the width of the confidence interval.

This makes it possible to define, with use in the operation 340, a membership vote $V_k(x)$ associated to classification of the measured time variable x as belonging to the message identifier $ID_k$, as expressed by the following Eq. (4):

$$V_k(x) = 1 - p_k = 1 - \frac{|\mu_{ID_k} - x|}{\frac{kz_\alpha}{\sqrt{M}}} \qquad (4)$$

The vote $V_k(x)$ refers to the k-th message identifier $ID_k$ from among the message identifiers allowed downstream of the whitelist filtering. Hence, in general, there will be n votes $V_1(x), \ldots, V_n(x)$ for the measured time variable x.

Consequently, the membership vote $V_k(x)$ associated to classification of the measured time variable x as belonging to the message identifier $ID_k$ (or the corresponding class) depends both upon its vicinity to the expected value, i.e., the mean value $\mu_{ID_k}$, and upon the width of the confidence interval for the expected value itself, which is defined, via the variance (or standard deviation), by the level of confidence via the quantile $z_\alpha$ and also by the number M of time-variable samples $x_i$ collected for a given identifier $ID_k$. Since we need to use a sample approximation, the higher the number of samples collected, i.e., the greater M is, the more the confidence interval represents accurately the possible range of values over which a certain measured quantity is distributed. Considering the limit case represented in FIG. 6, it may be noted that the definition of membership vote associated to an identifier or class is consistent with the example presented. In fact, if $\mu_1 = \mu_2$, to decide which vote is the highest it is sufficient to consider the variance, or the standard deviation, in so far as $V_1 > V_2$ implies, in this limit case, according to Eq. (4), that $s_2 > s_1$. This result is consistent in so far as, in the case where the distance from the centre of the confidence interval is the same, if the width of the confidence interval is different, it means that the measured quantity is closer to the extreme of one of the intervals, which renders less probable for the measured quantity to belong to the identifier ID to which the narrower confidence interval is associated.

The definition of vote according to Eq. (4) also covers a second limit case, i.e., the one in which two confidence intervals have the same width but have a different centre. In this case, voting is decided on the basis of just the distance between the measured value and expected value associated to the confidence interval. In particular, $V_1 > V_2$ implies $|\mu_2 - x| > |\mu_1 - x|$. It may in any case be stated that this, apart from being a limit case in analytical terms, is, in practice, a "pathological" case. As already discussed previously, however similar to one another two physically distinct ECUs 11 may be, they are always characterized by a system clock of their own, with unique fluctuations. An example case as the one represented in FIG. 4 is hence far from likely to occur, whereas the case $\mu_1 = \mu_2$ with $s_1 = s_2$ is not even contemplated. It is, however, possible for two message identifiers ID to be characterized by expected values and sample variances associated to the confidence intervals that are quite close to one another in value. Limiting the analysis to the confidence intervals for the expected value, even though it is possible to discriminate membership via the definition of vote, there may arise cases in which the difference in vote is not very marked and hence the result of classification could be unsatisfactory.

To prevent situations of indecision, in addition to the confidence intervals for the expected value, in step 240 the confidence intervals for the variance $VIC_k$ are hence also calculated.

Provided hereinafter are the basic passages of construction of the confidence intervals for the variance $VIC_k$. If $\beta$ denotes the confidence index on the variance, then a probability $$P(s^2_{ID_k} \in ID_k)$$

that a measurement of variance $$s^2_k$$

belongs to the k-th message identifier $ID_k$ to which a variance of $$s^2_{ID_k}$$

is associated (of which an interval of membership values is estimated via the sample knowledge) can be expressed as in the following Eq. (5):

$$1 - \beta = P(s^2_{ID_k} \in ID_k) = \qquad (5)$$

$$P(s^2_{ID_k} \in [\bar{s}^2_k, \underline{s}^2_k]) = P\left(\frac{s^2_{ID_k}(M-1)}{\sigma^2_{ID_k}} \in \left[\overline{X}_{\beta,M-1}, \underline{X}_{\beta,M-1}\right]\right)$$

Eq. (5) exploits the fact that $$S^2_{ID_k}(M-1)/\sigma^2_{ID_k} \sim X_{M-1},$$

i.e., that the normalized sample variance has a distribution of a chi-squared type with M−1 degrees of freedom. The quantities $\overline{X}_{\beta,M-1}$ and $\underline{X}_{\beta,M-1}$ represent the quantiles of level β for the chi-squared distribution with M−1 degrees of freedom. In particular, $\overline{X}_{\beta,M-1}$ is the quantile that leaves on its left a probability of β/2, whereas $\underline{X}_{\beta,M-1}$ is the quantile that leaves on its right the same probability. Operating on the argument of the probability operator, we obtain the confidence interval for the (sample) variance associated to the k-th ID, as in Eq. (6) below:

$$\sigma^2_{ID_k} \in \left[ \frac{(M-1)s^2_{ID_k}}{\underline{X}_{\beta,M-1}}, \frac{(M-1)s^2_{ID_k}}{\overline{X}_{\beta,M-1}} \right] \quad (6)$$

Of each confidence interval for the variance $VIC_k$, in a way quite similar to what we have seen in the assignment of the votes for the confidence intervals of the expected value, it is necessary to know the centroid and the width. The expressions of centroid and width of the k-th variance confidence interval appear in Eq. (7) below:

$$S^2_{m_k} = \frac{(M-1)s^2_{ID_k}}{2} \left( \frac{1}{\overline{X}_{\beta,M-1}} + \frac{1}{\underline{X}_{\beta,M-1}} \right) \quad (7)$$

$$L_{S_k} = (M-1)s^2_{ID_k} \left( \frac{1}{\underline{X}_{\beta,M-1}} - \frac{1}{\overline{X}_{\beta,M-1}} \right)$$

The expressions of Eq. (7), where denoted by $$S^2_{m_k}$$

is the centroid of the confidence interval of the variance and denoted by $L_{S_k}$ is its width or length, make it possible to define a vote $W_k(s^2)$ also for the measurement of variance, taking into account the distance from the centroid and the length of the interval (in a way similar to what has been done for the confidence intervals for the expected value), as in Eq. (8) below:

$$W_k(s^2) = 1 - \frac{|S^2_{m_k} - s^2|}{\frac{L_{S_k}}{2}} = 1 - 2 \frac{\left| \frac{(M-1)}{2} s^2_{ID_k} \left( \frac{1}{\underline{X}_{\beta,M-1}} + \frac{1}{\overline{X}_{\beta,M-1}} \right) - s^2 \right|}{(M-1)s^2_{ID_k} \left( \frac{1}{\underline{X}_{\beta,M-1}} - \frac{1}{\overline{X}_{\beta,M-1}} \right)} \quad (8)$$

Denoted by $s^2$ is the variance of the current measured value x.

The votes appearing in Eqs. (4) and (8), as explained in further detail hereinafter, are then calculated in the subsequent classification and anomaly-detection step 300. The step 240 of calculation of the statistical parameters and of the confidence thresholds, to be used in the subsequent classification and anomaly-detection step 300 terminates, instead, with calculation of the expression of Eq. (7).

Following upon the learning step 200, for each message identifier $ID_k$ contained in the whitelist WL, the quantities necessary for calculation of the message-identifier votes are thus stored. Hence, at the end of the learning procedure 200, for each message identifier $ID_k$, stored in the protection and monitoring device 20 are the following quantities, namely, a vector of statistical parameters of the confidence intervals $\vec{\omega}_{ID_k}$:

$$\mu_{ID_k}, \mu_{ID_k} \pm \frac{z_\alpha s_{ID_k}}{\sqrt{M}}, \frac{(M-1)s^2_{ID_k}}{\underline{X}_{\beta,M-1}}, \frac{(M-1)s^2_{ID_k}}{\overline{X}_{\beta,M-1}}, S^2_{m_k}$$

i.e., the mean value $\mu_{ID_k}$ (centroid of the confidence interval $IC_k$), the confidence interval for the mean value $$\mu_{ID_k} \pm \frac{z_\alpha s_{ID_k}}{\sqrt{M}}$$

(i.e., $IC_k$), the confidence interval for the sample variance, $$\frac{(M-1)s^2_{ID_k}}{\underline{X}_{\beta,M-1}}, \frac{(M-1)s^2_{ID_k}}{\overline{X}_{\beta,M-1}}$$

(i.e., $VIC_k$), and the centroid $$S^2_{m_k}$$

of the confidence interval $VIC_k$, that is the quantities necessary for calculation of the votes in the operation 340.

This makes it possible to optimize memory use in implementation of embedded systems in so far as the memory space that was required in the step of data collection 230, i.e., of filling of the learning vectors $\vec{v}_{ID_k}$, can be deallocated. The space necessary (which remains allocated at the end of the learning step 200) for containing the information to be used in the subsequent classification and monitoring step 300 is represented by arrays of six components, i.e., $$\mu_{ID_k}, \mu_{ID_k} \pm \frac{z_\alpha s_{ID_k}}{\sqrt{M}}, \frac{(M-1)s^2_{ID_k}}{\underline{X}_{\beta,M-1}}, \frac{(M-1)s^2_{ID_k}}{\overline{X}_{\beta,M-1}}, S^2_{m_k},$$

for each of the message identifiers ID, as against the learning vectors $\vec{v}_{ID_k}$ of dimension M, which is much greater than six, on account of the operating hypotheses introduced previously.

FIG. 6 specifically shows a general flowchart of the protection and monitoring method 100, also indicated in which are the operations of memory allocation, for example in the microcontroller 14. The protection and monitoring method 100, as mentioned, comprises the online learning step 200, carried out in a first time interval, in particular a vehicle testing step, and a subsequent classification and anomaly-detection step 300, carried out in a second time interval, in general corresponding to normal use of the communication network 10 and of the vehicle in which it operates, i.e., when the vehicle is used by the end user or purchaser.

For the learning step 200 indicated in FIG. 6 are the timestamp vectors of size M, $\vec{v}_{ID_k}$, which can be allocated after filtering 210, on the basis of the number n of message identifiers envisaged in the whitelist WL, via an operation of memory allocation 211 that allocates a memory space in the memory of the device 20 (microcontroller 14) proportional to n×M. Clearly, in variant embodiments, allocation can occur also prior to filtering 210 if the value n deriving from setting of the whitelist WL is known.

The operations 220-250 are then carried out until vectors of statistical parameters of the confidence intervals, $$\vec{\omega}_{ID_k} = \left[ \mu_{ID_k}, \mu_{ID_k} \pm \frac{z_\alpha s_{ID_k}}{\sqrt{M}}, \frac{(M-1)s_{ID_k}^2}{\chi_{\beta,M-1}}, \frac{(M-1)s_{ID_k}^2}{\bar{\chi}_{\beta,M-1}}, S_{m_k}^2 \right],$$

are obtained as output from the learning step 200, the above vectors comprising the statistical parameters useful for defining the confidence intervals and the votes. For the above statistical parameters $\omega_{ID_k}$ a memory allocation 251 is carried out, which allocates memory space proportional to n×Q, where Q is the number of statistical parameters used, which in the example corresponds to 6. There is then carried out an operation of deallocation 252 of the memory of dimension n×M previously allocated for the timestamp vectors $\vec{v}_{ID_k}$.

Once again with reference to FIG. 3, described now in detail are some of the operations of the classification step 300.

The operations 310, 320 substantially correspond to operations 210, 220.

As regards the operation 330, in the step 300 of classification and detection of anomalies in the message traffic, a given amount of data, i.e., time-variable values corresponding to timestamps $TS'_{ID_k}$, is to be collected to be able to obtain corresponding measurements of expected value and sample variance $$(\mu_{ID_k}, s_{ID_k}^2).$$

In a way similar to the operation 230 monitored-timestamp vectors $\vec{\mu}_{ID_k}$ are allocated, which, as already mentioned, are not, however, merely filled, but are continuously filled and emptied during traffic analysis according to a FIFO approach. In particular, for each of the message identifiers $ID_k$, a monitored-timestamp vector $\vec{\mu}_{IDk}$ is filled with time measurements $TS'_{IDk}$ (in a way similar to what was done during the collection step 230 with the timestamp vectors $\vec{v}_{ID_k}$). The cardinality of the monitored-timestamp vectors $\vec{\mu}_{ID_k}$, i.e., the size or length, should theoretically be the same as that of the learning-timestamp vectors $\vec{v}_{ID_k}$, i.e., M, but for formal mathematical purposes it is denoted by m. For the first evaluation of sample mean and variance it is hence necessary to wait for m time measurements for each of the message identifiers $ID_1, \ldots, ID_n$, so as to have a sufficient number of samples from which to extrapolate, i.e. calculate, the measurements of expected value and variance, which will then be evaluated via the votes $V_k$ (x) and $W_k$ ($s^2$) defined previously. From the instant when there is available the aforesaid number of measurements, it is possible to re-evaluate the expected value and variance of each message identifier $ID_1, \ldots, ID_n$, at each new time measurement collected. To carry out the evaluation on sets of size m, it is chosen to collect the last time measurement made for the k-th message identifier $ID_k$ in the corresponding monitored-timestamp vectors $\vec{\mu}_{ID_k}$ and discard the oldest time measurement. This makes it possible to monitor the evolution of the sample expected value and of the sample variance at each step of the classification and anomaly-detection step 300.

It is exemplified the concept of evolution in time for the evaluation of the sets of m consecutive time measurements for a generic message identifier $ID_k$.

In this regard, the generic monitored-timestamp vector $\vec{\mu}_{ID_k}$ is described in different instants from $t_0$ to $t_{m+h}$.

Denoted by $t_j$ is the j-th instant in which a new time measurement $TS'_{IDk}[t_j]$ is collected, i.e., received. At the initial instant to the monitored-timestamp vector $\vec{\mu}_{ID_k}$ comprises m elements initialized at zero (vector $\vec{\mu}_{ID_k}[t_0]$). At the next instant $t_1$ stored in the first element of the vector is the first timestamp $TS'_{ID_k}[t_1]$ received (vector $\vec{\mu}_{ID_k}[t_1]$). At the next instant $t_2$ the second timestamp $TS'_{ID_k}[t_2]$ is stored at the start of the vector $\vec{\mu}_{ID_k}[t_1]$, after the first timestamp $TS'_{IDk}[t_1]$ has been shifted by one place to the right. The same procedure is followed for the subsequent timestamps received, until, at the instant $t_m$, a vector $\vec{\mu}_{ID_k}[t_m]$ is obtained, filled with elements $TS'_{IDk}[t_m]$, $TS'_{IDk}[t_{m-1}], \ldots, TS'_{IDk}[t_2], TS'_{IDk}[t_1]$. Also for the subsequent timestamps received after the vector $\vec{\mu}_{ID_k}[t_m]$ has been filled, a shift to the right is performed, progressively eliminating from the vector the oldest samples, starting from $TS'_{IDk}[t_1]$. At a subsequent instant $t_{m+h}$, where h denotes an additional number of timestamps received, the vector $\vec{\mu}_{ID_k}[t_{m+h}]$ comprises $TS'_{IDk}[t_{m+h}]$, $TS'_{IDk}[t_{m+h-1}], \ldots, TS'_{IDk}[t_{h+2}], TS'_{IDk}[t_{h+1}]$.

Hence, during the classification and anomaly-detection step 300, the quantities expected value and sample variance $$(\mu'_{ID_k}, s'^2_{ID_k})$$

are to be understood as time-variant. This means that also the votes calculated in the subsequent step 340 are time-variant.

Hence, in the operation 340, on the basis of the monitoring vectors $\mu ID_k$, corresponding votes $V_k$ and $W_k$ are calculated according to Eqs. (4) and (8) as a function of the values of expected value and sample variance $$(\mu'_{ID_k}, s'^2_{ID_k})$$

measured in the operation 330 and as a function of the confidence-interval statistical parameters $\vec{\omega}_{ID_k}$ calculated in the operation 250 of the learning step 200.

In the following for simplicity it is sometimes omitted the apex " " indicating quantities pertaining the operation 300, such as $$(\mu'_{ID_k}, s'^2_{ID_k}).$$

Hence, there is measured, for example, $$V_k(x) = 1 - p_k(x) = 1 - \frac{|\mu_{ID_k} - x|}{\dfrac{s_{ID_k} z_\alpha}{\sqrt{M}}}$$

where the measured variable is the mean value $$\mu'_{ID_k}$$

of the timestamp samples measured in the second time interval (e.g., during normal use of the vehicle).

Likewise the following is calculated:

$$W_k(s^2) = 1 - \frac{|S^2_{m_k} - s^2|}{\dfrac{L_{s_k}}{2}} = 1 - 2\frac{\left|\dfrac{(M-1)}{2}s^2_{ID_k}\left(\dfrac{1}{X_{\beta,M-1}} = \dfrac{1}{\overline{X}_{\beta,M-1}}\right) - s^2\right|}{(M-1)s^2_{ID_k}\left(\dfrac{1}{X_{\beta,M-1}} - \dfrac{1}{\overline{X}_{\beta,M-1}}\right)}$$

where the measured variable $s^2$ is the sample variance $$s'^2_{ID_k}$$

of the timestamp samples measured in the second time interval.

Hence, whenever the M timestamp samples arrive (for each of the identifiers with k ranging from 1 to n), there is calculated the mean value and the sample variance to both of which a vote is assigned on the basis of the confidence intervals calculated in the previous learning step.

Moreover, in the operation 340, associated to each k-th vector $\vec{\mu}_{ID_k}[t_j]$ are two (time-variant) n-tuples $\vec{V}(\vec{\mu}_{ID_k}[t_j])$ and $\vec{W}(\vec{\mu}_{ID_k}[t_j])$ containing the membership votes associated to each message identifier $ID_1, \ldots, ID_n$ with respect both to the expected value and to the sample variance. The two n-tuples have the structure appearing in Eq. (9):

$$\vec{V}(\vec{u}_{ID_k}[t_j]) = \begin{bmatrix} V_1(\mu_{ID_k}[t_j]) \\ V_2(\mu_{ID_k}[t_j]) \\ \vdots \\ V_n(\mu_{ID_k}[t_j]) \end{bmatrix} \quad \vec{W}(\vec{u}_{ID_k}[t_j]) = \begin{bmatrix} W_1(s^2_{ID_k}[t_j]) \\ W_2(s^2_{ID_k}[t_j]) \\ \vdots \\ W_n(s^2_{ID_k}[t_j]) \end{bmatrix} \tag{9}$$

Denoted by $t_j$ is a generic instant, for example between $t_0$ and $t_{m+h}$, in any case belonging to the second time interval.

Consequently, at the level of memory allocation, for each message identifier $ID_1, \ldots, ID_n$ in the whitelist WL an array of dimensions n×2 is required, for a total of n arrays of dimensions n×2, which, if they are to be allocated contiguously, correspond to $2n^2$ fixed allocated variables.

Then, in the subsequent counting operation 350, it is envisaged to provide arrays of counters $\vec{CV}_k$, $\vec{CW}_k$, containing respective counters $CV_{1,k}$, where for reasons of clarity from now on denoted by the index 1 ranging from 1 to n is the identifier $ID_1$ the parameters of confidence intervals of which are supplied by the step 250, whereas denoted by the index k is the identifier $ID_k$ of the message MSG' currently received in step 300, the above counters $CV_{1,k}$ being associated to each of the votes $V_k(\mu_{ID_k}[t_j])$ and respective counters $\vec{CW}_k$ being associated to each of the votes $$W_k(s^2_{ID_k}[t_j]).$$

The structure of the arrays of counters $\vec{CV}_k$, $\vec{CW}_k$ is provided in Eq. 10 below:

$$\vec{CV}_k = \begin{bmatrix} CV_{1,k} \\ CV_{2,k} \\ \vdots \\ CV_{n,k} \end{bmatrix} \quad \vec{CW}_k = \begin{bmatrix} CW_{1,k} \\ CW_{2,k} \\ \vdots \\ CW_{n,k} \end{bmatrix} \tag{10}$$

where denoted by $CV_{1,k}$ is the counter that is incremented whenever the measurement of the expected value $$\mu'_{ID_k}$$

for the k-th identifier $ID_k$ receives the maximum vote $V_1(\mu_{ID_k}[t_j])$ for membership in the confidence interval associated to the l-th identifier $ID_1$, and likewise denoted by $CW_{1,k}$ is the counter that is incremented whenever the measurement of sample variance $$s^2_{ID_k}$$

for the k-th identifier $ID_k$ receives the maximum vote $$W_1(s^2_{ID_k}[t_j])$$

for membership in the confidence interval of variance associated to the l-th identifier $ID_1$.

The counters $CV_{1,k}$ and $CW_{1,k}$ are defined for $1 \neq k$, in so far as theoretically $CV_{k,k}$ and $CW_{k,k}$ would be incremented in an indefinite way. Instead, the counters $CV_{1,k}$ and $CW_{1,k}$ are used, in the operation 360, to determine a maximum number of wrong identifier attributions $\widetilde{NW}$, i.e., a maximum number of times in which it is accepted to "confuse" the identifiers ID with one another. Increment of the counters $CV_{1,k}$ and $CW_{1,k}$ follows the procedure appearing below (in pseudocode version).

$$CV_{l,k} = 0$$

$$CW_{l,k} = 0$$

$$\forall\, 1:$$

$$\text{if } V_l(\mu_{ID_k}[t]) = \max_j\left\{\vec{V}(\vec{u}_{ID_k}[t])\right\}_j : CV_{l,k} = CV_{l,k} + 1$$

$$\text{if } CV_{l,k} = 0 : CV_{l,k} = CV_{l,k} + 0$$

$$\text{if } CV_{l,k} > 0 : CV_{l,k} = CV_{l,k} - 1$$

$$\text{if } W_k(s^2_{ID_k}[t]) = \max_j\left\{\vec{W}(\vec{u}_{ID_k}[t])\right\}_j : CW_{l,k} = CW_{l,k} + 1$$

-continued $$\text{if } CW_{l,k} = 0 : CW_{l,k} = CW_{l,k} + 0$$

$$\text{if } CW_{l,k} > 0 : CW_{l,k} = CW_{l,k} - 1$$

Hence, as long as the values in the counters $CV_{1,k}$ and $CW_{1,k}$ are lower than said maximum number of wrong attributions $\widetilde{NW}$ no alarm AL is generated by the step 300, in particular by the operation 360. As soon as a counter exceeds the threshold of the maximum number of wrong attributions $\widetilde{NW}$, an alarm AL or warning is generated, the type or contents of which depend upon the combinations of values assumed by the counters $CV_{1,k}$ and $CW_{1,k}$. The combinations and the reasonings behind generation of the warning are as follows:

in a first combination, the expected value $$\mu'_{ID_k}$$

for the k-th message identifier $ID_k$ falls, for a number of times greater than a given threshold, within the confidence interval of the expected value of the l-th identifier $ID_1$—i.e., the counter $CV_{1,k}$ exceeds the threshold of wrong attributions $\widetilde{NW}$—whereas, as regards the sample variances $$s'^2_{ID_k}$$

the counters remain within the above threshold $\widetilde{NW}$. This is the case where it is likely that the k-th message identifier $ID_k$ is sent with the periodicity of the l-th identifier $ID_1$. The logic is that of combining this information with the prior knowledge on which the identifiers ID belong to the ECUs and on the periodicity of the messages so as to be able to infer the type of attack. In particular, if the expected periodicity $T_1$ of the l-th identifier $ID_1$ is much higher than the periodicity $T_k$ expected for k-th message identifier $ID_k$, but the priority of the k-th identifier $ID_k$ is instead higher than that of the l-th identifier $ID_1$, the monitoring system will issue a warning to indicate that the ECU to which the k-th message identifier $ID_k$ is associated has changed its behaviour. According to the standard definitions of the attacks, the traffic is jammed by a high-frequency and high-priority message, and then an attack of a DOS (Denial-of-System) type is likely, and the probable attacker is precisely the ECU that, according to prior knowledge, is associated to the k-th message identifier $ID_k$;

in a second combination, $$s'^2_{ID_k}$$

falls, for a number of times greater than a given respective threshold, in the confidence interval of the sample variance of the l-th identifier $ID_1$—i.e., the corresponding counter $CW_{1,k}$ exceeds the threshold of wrong attributions $\widetilde{NW}$—whereas, as regards the expected value $\mu_{ID_k}$, of the l-th identifier 1, the counters remain within the thresholds. This could be the case where the k-th identifier $ID_k$ is sent with the periodicity $T_k$ that is correct but, since the variance is different from the expected one, it is likely that the source/ECU, i.e., the node 11 has changed, which is probably the source/ECU associated to the l-th identifier $ID_1$. From a standpoint of the traffic of the messages in the network/sub-network monitored, this is a weak attack, according to the definitions. It is, however, a non-negligible traffic anomaly, which creates problems on the information content of the messages sent with the k-th identifier $ID_k$. Consider the fact that the ECU 11 that originally has to send messages with the k-th identifier $ID_k$ is connected to inputs (sensors) from which it picks up information on the state of the vehicle that is in general different from the information of the ECU associated to the l-th identifier $ID_1$. Since this is the "new" ECU that is sending the message with the k-th identifier $ID_k$, the information content of the messages (in the sense of data-frame) is altered;

in a third combination, both the expected value $$\mu'_{ID_k}$$

and the sample variance $$s'^2_{ID_k}$$

fall outside the expected confidence intervals for a number of times greater than a common threshold or than respective thresholds. This can mean that the k-th identifier $ID_k$ has changed both its periodicity $T_k$ and the source, i.e., the transmitting node 11. This case compounds the problems of the attacks described with reference to the first two combinations and highlights the presence of another anomaly. The fact that the periodicity has changed and that the measurement of expected value is associated to another identifier $ID_1$ (associated, for example, to the ECU 11₁), hence with $CV_{1,k} > \widetilde{NW}$, whereas the measurement of variability/variance is associated to an identifier $ID_p$ (associated, for example, to the ECU 11ₚ), i.e., $CW_{p,k} > \widetilde{NW}$, may imply one of the following two alarm conditions:

the ECU 11ₚ impersonates the ECU 11₁, in effect sending messages with identifier ID for which transmission is allowed (something which can be verified with prior knowledge by means of the whitelist WL), but that have information content not consistent with the expected one. Moreover, such messages can be sent by the "wrong" ECU 11ₚ, with a periodicity that is not consistent with the prior knowledge, such as to represent also a DOS attack; or an external ECU is connected to the network and sends messages with identifier $ID_k$ with a periodicity similar to the periodicity expected for the identifier $ID_1$, but the variability of the time measurements that is most linked to the physical and intrinsic characteristics of the devices is associated to the ECU that sends messages with identifier $ID_p$. The apparent inconsistency between the confidence interval for the periodicity and the confidence interval for the variability may be associated to the presence of a device/ECU not envisaged in the topology of the network being monitored.

Hence, on the basis of what has been described, the method disclosed herein for protection from cyber attacks in a communication network 10, and in one embodiment a CAN (Controller Area Network), of a vehicle, the network including:

a communication bus 10, which may include a CAN-bus;

a plurality of nodes 11 associated to the communication bus 10 in a signal-exchange relationship and associated at least in part to control units for controlling functions of the vehicle, wherein the nodes 11 exchange messages MSG, MSG' passing between nodes of the plurality of nodes 11, and wherein the messages MSG are distinguished by respective message identifiers ID, said method 100 comprising, at a control node 20 associated to said communication bus 10, the steps of:

executing a protection and monitoring procedure 100 comprising:

a learning step 200, which is carried out during a first time interval and which includes:

acquiring 210, 220, 230 sets $\vec{v}_{ID_k}$ of values of times of arrival $TS_{IDk}$ at the device 20 of messages MSG exchanged on the network 10, ordered according to a respective message identifier $ID_k$, computing 240 one or more statistical parameters, for example $\mu_{ID_k}$, $$s^2_{ID_k},$$

of the sets of arrival-time values ($TS_{IDk}$), and subsequently obtaining 250 statistical parameters $\vec{\omega}_{ID_k}$ of confidence windows for the one or more statistical parameters $\mu_{ID_k}$, $$s^2_{ID_k},$$

of the sets of arrival-time values $TS_{IDk}$; and a subsequent classification and anomaly-detection step, in particular designated by 300, which is carried out during a second time interval and comprises:

acquiring 310, 320, 330 sets $\vec{\mu}_{ID_k}$ of values of times of arrival $TS'_{IDk}$ at the device 20 of messages MSG', computing 340 corresponding one or more statistical parameters, for example, $$\mu'_{ID_k}, s'^2_{ID_k},$$

of the sets of arrival-time values $TS'_{IDk}$ to obtain votes V, W of membership of the one or more statistical parameters $$\mu'_{ID_k}, s'^2_{ID_k}$$

of said sets of arrival-time values $TS'_{IDk}$ in confidence windows of the sets of arrival-time values $TS_{IDk}$ acquired during the learning step 200 on the basis of the statistical parameters $\vec{\omega}_{IDk}$ of confidence windows for the one or more statistical parameters $$\mu'_{ID_k}, s'^2_{ID_k}$$

of the sets of arrival-time values $TS_{IDk}$, and evaluating 350, 360 issuing of malicious-message alarms AL on the basis of said membership votes V, W.

Moreover, in the above method, the step of acquiring 210, 220, 230 sets $\vec{v}_{ID_k}$ of arrival-time values $TS_{IDk}$ in the learning step 200 further includes:

prefiltering 210 the messages MSG on the basis of their message identifiers ID via a whitelist filtering;

calculating 220 timestamps TS to be used as measured variable x for calculating the statistical quantities;

a data-collection operation 230, where, for each of the message identifiers $ID_k$, a corresponding learning vector $\vec{v}_{ID_k}$ is filled with corresponding timestamp measurements $TS_k$.

The step of subsequently obtaining 250 statistical parameters $\vec{\omega}_{ID_k}$ of confidence windows for the statistical parameters of the sets of arrival-time values $TS_{IDk}$ further includes an operation of quantization of confidence intervals, where the one or more statistical parameters $\mu_{ID_k}$, $$s^2_{ID_k},$$

in particular mean or sample variance, are normalized, for example to obtain normalized statistical parameters $p_i$, $$S^2_{m_k},$$

$L_{S_k}$, with respect to the width of the respective confidence interval, and the respective vote is calculated as a function of said one or more normalized statistical parameters $p_i$, $$S^2_{m_k},$$

$L_{S_k}$.

The step of acquiring 310, 320, 330 sets $\vec{\mu} ID_k$ of values of times of arrival $TS'_{IDk}$ at the device 20 of messages MSG' in the classification and anomaly-detection step 300 further includes the steps of:

filtering 310 the messages MSG' on the basis of their message identifiers ID via filtering with the whitelist WL, a data-collection operation 330, where, for each of the message identifiers $ID_k$, a corresponding monitoring vector $\vec{\mu}_{ID_k}$ is filled with corresponding timestamp measurements $TS'_k$, in particular the monitoring vector $\vec{\mu}_{ID_k}$ being filled in FIFO mode.

The operation 340 of calculation of the membership vote $V_k$, $W_k$ on the basis of the confidence-interval statistical parameters $\vec{\omega}_{ID_k}$ determined and supplied by the learning step 200 being carried out as a function of the one or more normalized statistical parameters $p_i$, $$S_{m_k}^2,$$

$L_{S_k}$ comprised in the confidence-interval statistical parameters $\vec{\omega}_{ID_k}$.

The operation of evaluating 350, 360 issuing of malicious-message alarms AL on the basis of the membership votes V, W includes, for at least one message identifier $ID_k$ being monitored the steps of:

counting a respective number of times in which the membership votes V, W of one or more statistical parameters

$$\mu'_{ID_k}, s'^2_{ID_k}$$

of arrival time of the identifier being monitored $ID_k$ assume a maximum value for membership in confidence intervals of message identifiers $ID_1, \ldots, ID_n$ other than the identifier being monitored $ID_k$, and if the respective number of times exceeds a respective threshold $\widetilde{NW}$ with respect to at least one of the confidence intervals of message identifiers $ID_1, \ldots, ID_n$ other than the identifier being monitored $ID_k$, issuing a network-anomaly alarm AL, the contents of which depend upon the message identifier or identifiers $ID_1, \ldots, ID_n$ other than the identifier being monitored $ID_k$ with respect to which the count exceeds a respective threshold $\widetilde{NW}$.

Moreover, in the method of the present invention, the step of computing 240 one or more statistical parameters $\mu_{ID_k}$,

$$s_{ID_k}^2$$

of the sets of arrival-time values $TS_{IDk}$ further includes the steps of:

computing, for each message identifier $ID_k$ respective values of mean value $pID_k$ of arrival time and of sample variance

$$s_{ID_k}^2$$

of arrival time, and comprises obtaining 250 statistical parameters $\vec{\omega}_{ID_k}$ of confidence windows, respectively, for the mean value $\mu_{ID_k}$ of arrival time and for the sample variance

$$s_{ID_k}^2$$

of arrival time.

The step of computing 340 corresponding one or more statistical parameters $$\mu'_{ID_k}, s'^2_{ID_k}$$

of the sets of arrival-time values $TS'_{IDk}$ to obtain votes V, W of membership further includes the step of computing 340 the mean value $$\mu'_{ID_k}$$

of arrival time and the sample variance $$s'^2_{ID_k}$$

of the sets of arrival-time values $TS'_{IDk}$ of the classification and anomaly-detection step 300 to obtain votes V, W of membership with respect to the mean value $$\mu'_{ID_k}$$

of arrival time and to the sample variance $$s'^2_{ID_k}$$

with respect to each confidence interval of confidence windows of the sets of arrival-time values $TS'_{IDK}$.

The step of evaluating 350, 360 issuing of malicious-message alarms AL on the basis of the membership votes V, W further includes, for at least one message identifier $ID_k$ being monitored the steps of:

counting a respective number of times in which the membership votes V, W of the respective mean value $$\mu'_{ID_k}$$

of arrival time and sample variance $$s'^2_{ID_k}$$

of arrival time of the identifier being monitored $ID_k$ assume a maximum value for membership in confidence intervals for the mean value $$\mu'_{ID_k}$$

and variance $$s'^2_{ID_k}$$

of message identifiers $ID_1, \ldots, ID_n$ other than said identifier being monitored $ID_k$; and if said respective number of times for mean value $$\mu'_{ID_k}$$

of arrival time and variance $$s'^2_{ID_k}$$

of arrival time of the identifier being monitored $ID_k$ exceeds a respective threshold $\widetilde{NW}$ with respect to at least one of the confidence intervals for the mean value, e.g.

$$\mu'_{ID_k}$$

and variance, e.g.

$$s'^2_{ID_k}$$

of message identifiers $ID_1, \ldots, ID_n$ other than the identifier being monitored $ID_k$, issuing 360 a network-anomaly alarm AL, the contents of which depend upon the at least one confidence interval for mean value $$\mu'_{ID_k}$$

and variance $$s'^2_{ID_k}$$

of message identifiers $ID_1, \ldots, ID_n$ other than the identifier being monitored $ID_k$ with respect to which the count exceeds a respective threshold $\widetilde{NW}$.

Moreover, in the above method, information known beforehand, regarding the network topology and/or the transmitting nodes 11 and/or the number and type of identifiers ID of the messages transmitted by each of said nodes, is accessible for carrying out the operations of the method.

Moreover, the above method comprises an operation of whitelist filtering, which accepts only the message identifiers ID effectively present in the whitelist associated to the control node. Types of identifiers ID extraneous to the list can be discarded, recorded in purposely provided data structures, and possibly notified to the user by means of specific signals.

Moreover, in the above method, the operation of measuring arrival times is carried out by acquiring the timestamps of arrival of the messages or else by measurement via the clock signal of the protection device 20.

Moreover, in the above method, the operation of issuing 360 a network-anomaly alarm AL, the contents of which depend upon the at least one confidence interval for mean value $$\mu'_{ID_k}$$

and variance $$s'^2_{ID_k}$$

of message identifiers $ID_1, \ldots, ID_n$ other than the identifier being monitored $ID_k$ with respect to which said count exceeds a respective threshold $\widetilde{NW}$, further includes the steps of evaluating:

in a first combination, if the expected value $$\mu'_{ID_k}$$

of an identifier being monitored $ID_k$ falls, for a number of times greater than a given threshold, within the confidence interval of the expected value of a different identifier $ID_1$, if the periodicity $T_1$ expected for the different identifier $ID_1$ is much higher than the periodicity $T_k$ expected for the identifier being monitored $ID_k$, issuing an alarm AL to indicate that the node 11 associated to the message identifier $ID_k$ being monitored has changed its behaviour;

in a second combination, if the variance $$s'^2_{ID_k}$$

of an identifier being monitored $ID_k$ falls, for a number of times greater than a given threshold, within the confidence interval of the expected value of a different identifier $ID_1$, indicating a probable change of transmitting node;

in a third combination, if both the expected value $$\mu'_{ID_k}$$

and the sample variance $$s'^2_{ID_k}$$

fall outside the confidence intervals expected for the identifier being monitored for a number of times greater than a common threshold or than respective thresholds, an eventuality that indicates that the identifier being monitored $ID_k$ has changed both its periodicity $T_k$ and the transmitting node 11, indicating via the alarm AL transmission of the message by a node other than the node associated to the message identifier being monitored or transmission by a node external to the network 10.

The present invention is also directed toward a device 20 for protection from cyber attacks in a communication network of a vehicle, and in one embodiment, a CAN (Controller Area Network), wherein the network includes:

a communication bus 10, such as a CAN-bus; and a plurality of nodes 11 associated to the communication bus 10 in a signal-exchange relationship and associated at least in part to control units for controlling functions of the vehicle, wherein the nodes 11 exchange messages M passing between nodes of the plurality of nodes 11, and the messages M are distinguished by respective message identifiers ID, wherein the device 20 is configured to operate according to the method described above.

In one embodiment, the protection device 20 is structured as a CAN node 11 and includes:

a CAN transceiver 12, associated to the CAN-bus 10, configured to manage the electrical levels of the CAN-bus 10;

a CAN controller 13, which is connected to the CAN transceiver 12 and is configured to manage the logic levels and serialization of the CAN-bus 10; and a microcontroller 14, which contains the message-transmitting and receiving logic. In one embodiment, the microcontroller 14 is configured to operate according to the method described above.

Hence, from what has been described above, the advantages of the proposed solution emerge clearly.

The solution described advantageously makes it possible to provide a device for protection and monitoring of the traffic on a CAN-bus, which can be integrated both on a system based upon microcontrollers and on application processors and which can be inserted in the communication network of the vehicle to identify any type of anomaly in the communication itself between the electronic devices, i.e., the nodes, internal to the architecture of the vehicle, in particular being based upon procedures that recognize the time drifts of the messages sent from one node to another.

The proposed solution is scalable, and has been presented both in the perspective of implementation on systems with computational capacities compatible with application processors (for example, of the type of the Cortex-A family, but not limited thereto) and in the perspective of implementation on platforms with limits of computational capacity and memory (for example, of the type of the Cortex-M family, but not limited thereto).

The method is described specifically with respect to calculation of one or more statistical parameters of the arrival times, which in the example set forth herein are the expected or mean value and the variance. As mentioned, considering only the confidence intervals for the expected value, even though it is possible to discriminate membership via vote definition, cases may arise in which the difference in vote is not very great, and hence the result of classification could be unsatisfactory. However, in variant embodiments, clearly one or more statistical parameters of the arrival times may comprise just the expected or mean value, so that only the vote regarding the mean value is calculated, and the alarms are issued only on the basis of the membership of the mean value in the corresponding classes of the message identifiers. More in general, one or more statistical parameters of the arrival times may comprise other indices or statistical moments, in which case the extremes of the confidence intervals for the aforesaid quantities are taken, and the votes are calculated in a way consistent with what has been illustrated in the description for the mean value and the variance.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. A method for protection from cyber attacks in a vehicle communication network, wherein the vehicle communication network includes:

a communication bus, a plurality of nodes associated to said communication bus in a signal-exchange relationship and associated at least in part to control units for controlling functions of a vehicle, said nodes exchanging messages (MSG, MSG') passing between nodes of said plurality of nodes, said messages being distinguished by respective message identifiers, said method comprising, at a control node associated to said communication bus, the steps of:

executing a protection and monitoring procedure comprising:

a learning step, which is carried out during a first time interval and comprises:

acquiring sets ($\vec{v}_{ID_k}$) of values of times of arrival ($TS_{IDk}$) at the device of messages (MSG) exchanged on the network, ordered according to a respective message identifier ($ID_k$), computing one or more statistical parameters $$(\mu_{ID_k}, s^2_{ID_k})$$

of said sets of arrival-time values ($TS_{Idk}$), and subsequently obtaining statistical parameters ($\vec{\omega}_{ID_k}$) of confidence windows for said one or more statistical parameters $$(\mu_{ID_k}, s^2_{ID_k})$$

of said sets of arrival-time values ($TS_{Idk}$); and a subsequent classification and anomaly-detection step, which is carried out during a second time interval and comprises:

acquiring sets ($\vec{\mu}_{ID_k}$) of values of times of arrival ($TS'_{Idk}$) at the device of messages (MSG'), computing corresponding one or more statistical parameters $$(\mu'_{ID_k}, s'^2_{ID_k})$$

of said sets of arrival-time values ($TS'_{Idk}$) then for one or moreof said respective identifiers subject tp monitoring ($ID_k$), in particular for each respective message identifier, to obtain votes of membership of said one or more second statistical parameters $$(\mu'_{ID_k}, s'^2_{ID_k})$$

of said second sets of arrival-time values ($TS'_{IDk}$) in respective confidence windows of the first sets of arrival-time values ($TS'_{IDK}$) acquired during the learning step, which comprise sets of arrival-time values ($TS'_{IDk}$) with different message identifiers ($ID_1$ . . . $ID_n$) with respect to the respective identifier subject monitoring ($ID_k$), on the basis of said statistical parameters ($\vec{\omega}_{ID_k}$) of confidence windows for said one or more second statistical parameters $$\left(\mu'_{ID_k}, s'^2_{ID_k}\right)$$

of said sets of arrival-time values (TS'$_{Idk}$) wherein the votes of membership is value representing a degree of membership in a given confidence interval, calculated on the basis of confidence-interval statistical parameters, determined and supplied by the learning step; and evaluating issuing of malicious-message alarms on the basis of said membership votes.

2. The method as set forth in claim 1, wherein the step of acquiring sets ($\vec{v}_{ID_k}$) of arrival-time values (TS$_{IDk}$) in said learning step further includes the steps of:

prefiltering the messages (MSG) on the basis of their message identifiers via a whitelist filtering;

calculating timestamps (TS) to be used as measured variable (x) for calculating the statistical quantities;

a data-collection operation, where, for each of the message identifiers (ID$_k$), a corresponding learning vector ($\vec{V}_{ID_k}$) is filled with corresponding timestamp measurements (TS$_k$), said subsequently obtaining statistical parameters ($\vec{\omega}_{ID_k}$) of confidence windows for said statistical parameters of said first sets of arrival-time values (TS$_{IDk}$) comprises an operation of quantization of confidence intervals, where said one or more second statistical parameters $$\left(\mu_{ID_k}, s^2_{ID_k}\right)$$

in particular mean or sample variance, are normalized (p$_i$, $$s^2_{m_k},$$

L$_{S_k}$) with respect to width of the respective confidence interval, and the respective vote is calculated as a function of said one or more normalized statistical parameters (p$_i$, $$s^2_{m_k},$$

L$_{S_k}$);

said acquiring second sets ($\vec{\mu}_{ID_k}$) of values of times of arrival (TS'$_{IDk}$) at the protection device of messages (MSG') in the classification and anomaly-detection step comprises:

a respective operation of filtering of the messages (MSG') on the basis of their message identifiers (ID) via filtering with said whitelist (WL), a data-collection operation, where, for each of the message identifiers (ID$_k$), a corresponding monitoring vector ($\vec{\mu}_{ID_k}$) is filled with corresponding timestamp measurements (TS'$_k$), in particular said monitoring vector ($\vec{\mu}_{ID_k}$) being filled in FIFO mode;

said step of calculating the membership vote (V$_k$, W$_k$) on the basis of the confidence-interval statistical parameters ($\vec{\omega}_{ID_k}$) determined and supplied by the learning step being carried out as a function of said one or more normalized statistical parameters (p$_i$, $$s^2_{m_k},$$

L$_{s_k}$) comprised in said confidence-interval statistical parameters ($\vec{\omega}_{ID_k}$);

said step of evaluating issuing of malicious-message alarms (AL) on the basis of said membership votes (V, W) comprises, for at least one message identifier (ID$_k$) being monitored:

counting a respective number of times in which said membership votes (V, W) of one or more statistical parameters $$\left(\mu'_{ID_k}, s'^2_{ID_k}\right)$$

of arrival time of said identifier being monitored (ID$_k$) assume a maximum value for membership in confidence intervals of message identifiers (ID$_1$, . . . , ID$_n$) other than said identifier being monitored (ID$_k$), and if said respective number of times exceeds a respective threshold ($\widetilde{NW}$) with respect to at least one of said confidence intervals of message identifiers (ID$_1$, . . . , ID$_n$) other than said identifier being monitored (ID$_k$), issuing a network-anomaly alarm (AL), the contents of which depend upon the message identifier or identifiers (ID$_1$, . . . , ID$_n$) other than said identifier being monitored (ID$_k$) with respect to which said count exceeds a respective threshold ($\widetilde{NW}$).

3. The method as set forth in claim 1, wherein:

said step of computing one or more statistical parameters $$\left(\mu_{ID_k}, s^2_{ID_k}\right)$$

of said first sets of arrival-time values (TS$_{IDk}$) further comprises the steps of:

computing, for each message identifier (ID$_k$) respective values of mean value ($\mu$ID$_k$) of arrival time and of sample variance $$\left(s^2_{ID_k}\right)$$

of arrival time, and obtaining statistical parameters ($\vec{\omega}_{ID_k}$) of confidence windows, respectively, for the mean value ($\mu_{ID_k}$) of arrival time and for the sample variance $$\left(s^2_{ID_k}\right)$$

of arrival time, said computing corresponding one or more statistical parameters $$\left(\mu'_{ID_k}, s'^2_{ID_k}\right)$$

of said second sets of arrival-time values ($TS'_{IDk}$) to obtain votes (V, W) of membership further includes the steps of computing the mean value $$\left(\mu'_{ID_k}\right)$$

and the sample variance $$\left(s'^2_{ID_k}\right)$$

of said second sets of arrival-time values ($TS'_{IDk}$) of the classification and anomaly-detection step obtaining votes (V, W) of membership with respect to the mean value $$\left(\mu'_{ID_k}\right)$$

of arrival time and to the sample variance $$\left(s'^2_{ID_k}\right)$$

with respect to each confidence interval of confidence windows of said second sets of arrival-time values ($TS'_{IDk}$),
said evaluating issuing of malicious-message alarms (AL) on the basis of said membership votes (V, W) further comprising the steps of, for at least one message identifier ($ID_k$) being monitored:
counting a respective number of times in which said membership votes (V, W) of the respective mean value $$\left(\mu'_{ID_k}\right)$$

of arrival time and sample variance $$\left(s'^2_{ID_k}\right)$$

of arrival time of said identifier being monitored ($ID_k$) assume a maximum value for membership in confidence intervals for the mean value $$\left(\mu'_{ID_k}\right)$$

and variance $$\left(s'^2_{ID_k}\right)$$

of message identifiers ($ID_1$, . . . , $ID_n$) other than said identifier being monitored ($ID_k$); and if said respective number of times for mean value $$\left(\mu'_{ID_k}\right)$$

of arrival time and variance $$\left(s'^2_{ID_k}\right)$$

of arrival time of said identifier being monitored ($ID_k$) exceeds a respective threshold ($\widetilde{NW}$) with respect to at least one of said confidence intervals for the mean value $$\left(\mu'_{ID_k}\right)$$

and variance $$\left(s'^2_{ID_k}\right)$$

of message identifiers ($ID_1$, . . . , $ID_n$) other than said identifier being monitored ($ID_k$),
issuing a network-anomaly alarm (AL), the contents of which depend upon the at least one confidence interval for mean value $$\left(\mu'_{ID_k}\right)$$

and variance $$\left(s'^2_{ID_k}\right)$$

of message identifiers ($ID_1$, . . . , $ID_n$) other than said identifier being monitored ($ID_k$) with respect to which said count that exceeds a respective threshold ($\widetilde{NW}$).

4. The method as set forth in claim 3, wherein said step of issuing a network-anomaly alarm (AL), the contents of which depend upon the at least one confidence interval for the mean value $$\left(\mu'_{ID_k}\right)$$

and variance $$\left(s'^2_{ID_k}\right)$$

of message identifiers ($ID_1$, . . . , $ID_n$) other than said identifier being monitored ($ID_k$) for which said count exceeds a respective threshold ($\widetilde{NW}$), comprises the steps of evaluating:

in a first combination if the expected value $$(\mu'_{ID_k})$$

of an identifier being monitored ($ID_k$) falls, for a number of times greater than a given threshold, within the confidence interval of the expected value of a different identifier ($ID_1$), if the periodicity ($T_1$) expected for the different identifier ($ID_1$) is higher than the periodicity ($T_k$) expected for the identifier being monitored ($ID_k$), issuing an alarm (AL) to indicate that the node associated to the message identifier ($ID_k$) being monitored has changed its behaviour;

in a second combination, if the variance $$(s'^2_{ID_k})$$

of an identifier being monitored ($ID_k$) falls, for a number of times greater than a given threshold, within the confidence interval of the expected value of a different identifier ($ID_1$), indicating a probable change of transmitting node;

in a third combination, if both the expected value $$(\mu'_{ID_k})$$

and the sample variance $$(s'^2_{ID_k})$$

fall outside the confidence intervals expected for the identifier being monitored for a number of times greater than a common threshold or than respective thresholds, an eventuality that indicates that the identifier being monitored ($ID_k$) has changed both its periodicity ($T_k$) and the transmitting node, indicating via the alarm (AL) transmission of the message by a node other than the node associated to the message identifier being monitored or transmission by a node external to the network.

5. The method as set forth in claim 1, wherein information known beforehand, regarding the network topology and/or the transmitting nodes and/or the number and type of identifiers (ID) of the messages transmitted by each of such nodes, is accessible for carrying out the operations of the method.

6. The method as set forth in claim 1, further including the step of filtering with whitelist (WL), which accepts only the message identifiers (ID) effectively present in said whitelist (WL) that is associated to the control node.

7. The method as set forth in claim 1, wherein said step of acquiring arrival times (TS, TS') in learning and classification and anomaly-detection steps are carried out by acquiring the timestamps of arrival of the messages or else by measurement via a clock signal of the protection device.

8. A device for protection from cyber attacks in a vehicle communication network comprising:
   a communication bus; and
   a plurality of nodes associated to said communication bus in a signal-exchange relationship and associated at least in part to control units for controlling functions of a vehicle,
   said nodes exchanging messages (M) passing between nodes of said plurality of nodes,
   said messages (M) being distinguished by respective message identifiers (ID),
   wherein said device is configured to operate according to the method as set forth in claim 1.

9. The protection device as set forth in claim 8, wherein said protection device is structured as a Controller Area Network (CAN) node and comprises:
   a CAN transceiver, associated to a CAN-bus, configured to manage the electrical levels of the CAN-bus;
   a CAN controller, which is connected to the CAN transceiver and is configured to manage logic levels and serialization of the CAN-bus; and
   a microcontroller, which contains the message-transmitting and receiving logic.

\* \* \* \* \*